(12) United States Patent
Shen

(10) Patent No.: US 12,273,447 B2
(45) Date of Patent: Apr. 8, 2025

(54) DEVICES AND METHODS UTILIZING SENSOR INFORMATION FOR INCREASED TRUST LEVEL

(71) Applicant: QUALCOMM Incorporated, San Diego, CA (US)

(72) Inventor: Asaf Shen, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 17/468,912

(22) Filed: Sep. 8, 2021

(65) Prior Publication Data

US 2023/0074708 A1    Mar. 9, 2023

(51) Int. Cl.
*H04L 9/08*    (2006.01)
*H04L 9/32*    (2006.01)

(52) U.S. Cl.
CPC ............ *H04L 9/0872* (2013.01); *H04L 9/083* (2013.01); *H04L 9/0894* (2013.01); *H04L 9/3231* (2013.01)

(58) Field of Classification Search
CPC ..... H04L 9/0872; H04L 9/083; H04L 9/0894; H04L 9/3231
See application file for complete search history.

(56) References Cited

U.S. PATENT DOCUMENTS

| | | | | |
|---|---|---|---|---|
| 10,984,120 B2* | 4/2021 | Nair | ...................... | H04W 12/08 |
| 11,494,497 B2* | 11/2022 | Kuo | ...................... | G06F 21/602 |
| 2016/0180078 A1* | 6/2016 | Chhabra | ................. | G06F 21/57 |
| | | | | 726/19 |
| 2017/0098102 A1* | 4/2017 | Coker | ..................... | G06F 21/76 |
| 2017/0373843 A1* | 12/2017 | Benson | .................... | G06F 21/74 |
| 2019/0073491 A1* | 3/2019 | Koyuncu | ............... | G06F 21/31 |
| 2019/0080072 A1* | 3/2019 | Van Os | ................... | G06F 3/016 |
| 2020/0082088 A1 | 3/2020 | Muthukumaran et al. | | |

OTHER PUBLICATIONS

International Search Report and Written Opinion—PCT/US2022/035638—ISA/EPO—Oct. 7, 2022.

* cited by examiner

*Primary Examiner* — Hee K Song
(74) *Attorney, Agent, or Firm* — Polsinelli

(57) ABSTRACT

Various embodiments may include methods and systems for providing security on a system-on-a-chip (SoC). A method may include receiving, from a service requesting environment by a secure subsystem, a request to perform a cryptographic function, in which the secure subsystem stores a condition for performing the requested cryptographic function. The method may further include receiving, by the secure subsystem, an input from a sensing circuit that includes at least one indication relevant to the condition for performing the requested cryptographic function, determining, by the secure subsystem, whether the input indicates that the condition for performing the requested cryptographic function is satisfied, and performing the requested cryptographic function using a cryptographic key stored in the secure subsystem in response to determining that the condition is satisfied.

30 Claims, 7 Drawing Sheets

DEVICES AND METHODS UTILIZING SENSOR INFORMATION FOR INCREASED TRUST LEVEL

BACKGROUND

System-on-a-chip (SoC) designs and devices are becoming more complex, implementing increased security mechanisms and robust trusted execution environments to combat unauthorized use of highly valuable cryptographic information. However, as more potential attackers become familiar with existing architectures and trusted execution environment implementations, virtual environments, which were intended to add an extra layer of security, may become compromised and may be utilized to bypass security measures altogether.

SUMMARY

Various aspects include methods and devices for utilizing sensor information for increasing trust level within a system performing cryptographic functions. In various aspects, a secure subsystem may store various conditions that must be satisfied in order to perform a cryptographic function requested by a service requesting environment. The secure subsystem may determine, using a key usage policy including the conditions, whether inputs received from a sensing circuit satisfy the conditions. Satisfaction of conditions corresponding to a requested cryptographic function may allow the secure subsystem to authorize usage of a cryptographic key to perform the requested cryptographic function.

Some aspects may include a system-on-a-chip (SoC) including a secure subsystem storing a cryptographic key and configured to: receive an input from a sensing circuit relevant to one or more conditions for performing a cryptographic function using the cryptographic key; and perform a cryptographic function in response to the received input indicating that a condition for performing the cryptographic function is satisfied.

Some aspects may further include a sensing circuit configured to sense a condition relevant to one or more conditions for performing the cryptographic function, in which the secure subsystem receives the input from the sensing circuit. In some aspects the secure subsystem may receive the input from a sensing circuit that is separate from the SoC.

In some aspects, the secure subsystem may be further configured to: receive a request for the cryptographic function from a service requesting environment; and perform the requested cryptographic function in response to the received input indicating that the condition for performing the requested cryptographic function is satisfied. In some aspects, the secure subsystem may be further configured to authorize usage of the cryptographic key corresponding to the cryptographic function to perform the requested cryptographic function in response to the received input indicating that the condition for performing the requested cryptographic function is satisfied.

In some aspects, the secure subsystem may be configured to receive the input from the sensing circuit along a communication path that is independent from a service requesting environment. In some aspects, the input may include a Boolean value indicating whether the condition for performing the cryptographic function is satisfied. In some aspects, the input may include operating sensor information, and the secure subsystem may be configured to continuously receive the input from the sensing circuit.

Some aspects may further include one or both of: a secure processing unit (SPU) storing the cryptographic key, and configured to receive a request to perform the cryptographic function from a service requesting environment; or an SoC root-of-trust (RoT) configured to: receive the input from the sensing circuit; and receive the request to perform the cryptographic function from the service requesting environment.

In some aspects, the condition for performing the cryptographic function may be whether a person is within a proximate range to physically operate a device, and the input may include an indication of a physical presence of the person within the proximate range to the device containing the SoC.

In some aspects, the condition for performing the cryptographic function may be whether user physical characteristics match authorized user physical characteristics, and the input may include an indication of present user physical characteristics of a user of a device containing the SoC.

In some aspects, the condition for performing the cryptographic function may be whether a device orientation is within acceptable thresholds, and the input may include an indication of the device orientation of a device including the SoC.

In some aspects, the condition for performing the cryptographic function may be whether a device location is in an authorized location, and the input may include an indication of the device location of a device including the SoC.

In some aspects, the condition for performing the cryptographic function may be whether a proximate device is an authorizing device, and the input may include an indication of the proximate device capable of connecting to a device including the SoC.

In some aspects, the condition for performing the cryptographic function may be whether a communication network matches an authorized communication network, and the input may include an indication of the communication network detected by a device including the SoC.

Further aspects may include a method for providing security in an SoC. Such aspects may include receiving, from a service requesting environment by a secure subsystem, a request to perform a cryptographic function, in which the secure subsystem stores a condition for performing the requested cryptographic function; receiving, by the secure subsystem, an input from a sensing circuit that includes at least one indication relevant to the condition for performing the requested cryptographic function; determining, by the secure subsystem, whether the input indicates that the condition for performing the requested cryptographic function is satisfied; and performing the requested cryptographic function using a cryptographic key stored in the secure subsystem in response to determining that the condition is satisfied.

In some aspects, receiving the input from the sensing circuit may include the secure subsystem receiving the input from the sensing circuit along a communication path that is independent from the service requesting environment. In some aspects, receiving the input from the sensing circuit may include receiving a Boolean value indicating whether the condition for performing the requested cryptographic function is satisfied. In some aspects, the input may be operating sensor information, and receiving the input from the sensing circuit may include the secure subsystem continuously receiving the input from the sensing circuit.

In some aspects, performing the requested cryptographic function in response to determining that the condition is satisfied may include performing the cryptographic function by one of a secure processing unit (SPU) or an SoC root-of-trust (RoT) in response to determining that the condition is satisfied.

In some aspects, the condition for performing the cryptographic function may be whether a person is within a proximate range to physically operate a device; and determining whether the input indicates that the condition for performing the requested cryptographic function is satisfied may include determining whether the input includes an indication of a physical presence of the person within the proximate range to the device containing the SoC.

In some aspects, the condition for performing the cryptographic function may be whether user physical characteristics match authorized user physical characteristics; and determining whether the input indicates that the condition for performing the requested cryptographic function is satisfied may include determining whether the input includes an indication of present user physical characteristics of a user of a device containing the SoC.

In some aspects, the condition for performing the cryptographic function may be whether a device orientation is within acceptable thresholds; and determining whether the input indicates that the condition for performing the requested cryptographic function is satisfied may include determining whether the input includes an indication of the device orientation of a device including the SoC.

In some aspects, the condition for performing the cryptographic function may be whether a device location is in an authorized location; and determining whether the input indicates that the condition for performing the requested cryptographic function is satisfied may include determining whether the input includes an indication of the device location of a device including the SoC.

In some aspects, the condition for performing the cryptographic function may be whether a proximate device is an authorizing device; and determining whether the input indicates that the condition for performing the requested cryptographic function is satisfied may include determining whether the input includes an indication of the proximate device capable of connecting to a device including the SoC.

In some aspects, the condition for performing the cryptographic function may be whether a communication network matches an authorized communication network; and determining whether the input indicates that the condition for performing the requested cryptographic function is satisfied may include determining whether the input includes an indication of the communication network detected by a device including the SoC.

Further aspects may include an SoC, including: a secure subsystem storing a cryptographic key and a condition for performing a cryptographic function, in which the secure subsystem includes: means for receiving a request to perform the cryptographic function; means for receiving an input from a sensing circuit that includes at least one indication relevant to at least one condition for performing the cryptographic function; means for determining whether the input indicates that the condition for performing the cryptographic function is satisfied; and means for performing the cryptographic function in response to determining that the condition is satisfied.

In some aspects, means for receiving the input from the sensing circuit may further include means for receiving the input from the sensing circuit along a communication path that is independent from a service requesting environment. In some aspects, means for receiving the input from the sensing circuit may include means for continuously receiving the input from an operating sensing circuit. Further aspects may include a non-transitory processor-readable medium having stored thereon processor-executable instructions configured to cause a processor within a secure subsystem of an integrated circuit to perform operations including: receiving a request to perform a cryptographic function from a service requesting environment; receiving an input from a sensing circuit that includes at least one indication relevant to a condition for performing the cryptographic function; determining whether the input indicates that the condition for performing the cryptographic function is satisfied; and performing the cryptographic function in response to determining that the condition is satisfied.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
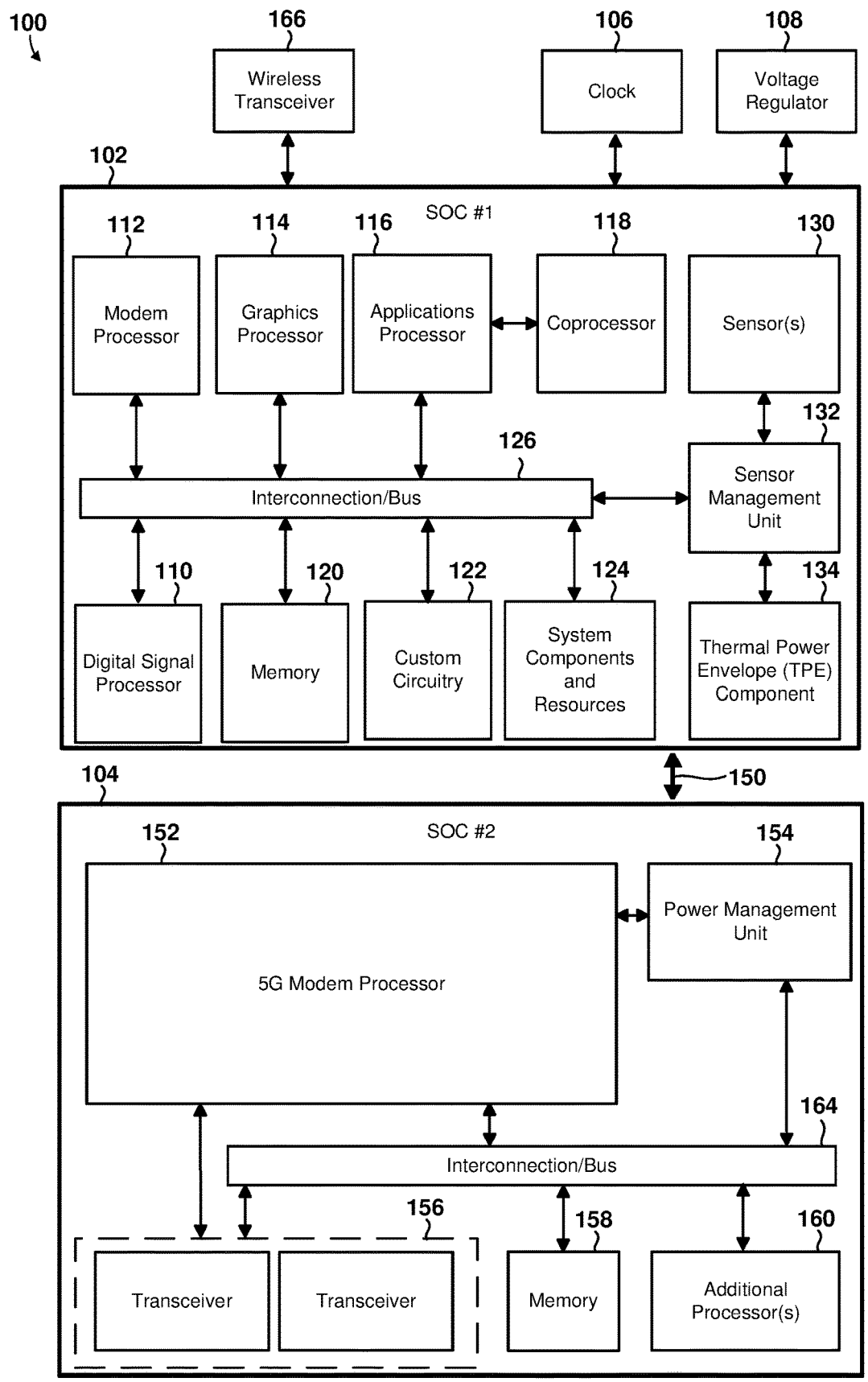
FIG. 1 is a component block diagram illustrating an example computing system that may be configured to provide security in a system-on-a-chip (SoC) according to some embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments include integrated circuit (IC) components, methods and devices for providing security within a system-on-a-chip (SoC). Various embodiments may utilize sensor information to increase the trust level within an SoC. Various embodiments include a secure subsystem storing a cryptographic key, in which the secure subsystem is configured to receive an input from a sensing circuit relevant to one or more conditions for performing a cryptographic function using the cryptographic key. The secure subsystem may be further configured to receive requests for cryptographic functions from a trust zone, or a service requesting environment, of the SoC, in which the request for each cryptographic function is associated with one or more conditions for performing the cryptographic function. The secure subsystem may be further configured to perform a requested cryptographic function in response to determining that the received input indicates that the condition of a requested cryptographic function is satisfied. In this manner, the secure subsystem is able to independently confirm that one or more conditions for performing the cryptographic function is satisfied before performing the cryptographic function, thus providing a second independent security check beyond security checks performed by the trust zone of the SoC.

The term "system-on-a-chip" (SoC) is used herein to refer to a set of interconnected electronic circuits typically, but not exclusively, including a processing device, a memory, and a communication interface. A processing device may include a variety of different types of processors and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The term "system-in-a-package" (SIP) is used herein to refer to a single module or package that contains multiple resources, computational units, cores or processors on two or more integrated circuit (IC) chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SoCs coupled together via high-speed communication circuitry and packaged in close proximity, such as on a single motherboard or in a single wireless device. The proximity of the SoCs facilitates high speed communications and the sharing of memory and resources.

Security sensitive services using high value cryptographic keys are typically granted through an application component, typically running in a higher trusted execution environment (TEE) in the application processor. For example, an application processor may implement a high-level operating system (HLOS) and a virtual environment (e.g., a Trust-Zone-based TEE, a hypervisor based virtual machine, etc.). A requested security sensitive service may be granted through a higher trust execution environment even if the cryptographic key value associated with the security sensitive service is not known to that higher trust execution environment, since the higher trust execution environment is itself responsible for authorizing usage of the key for requested security sensitive services.

In such an architecture, if the application component or the TEE in which the application component operates becomes compromised, the cryptographic key-based services might be granted regardless of the eligibility of the requesting entity (i.e., may be granted even if the usage criteria/conditions are not met). For example, a compromised TEE might authorize usage of a cryptographic key for a requested cryptographic service that requires the presence of an authorized user, despite the failure of a user authentication check. Thus, a compromised TEE may respond to and execute illegitimate requested cryptographic services including authorizing usage of cryptographic keys, allowing attackers to gain access to secure information without having to meet any security authentication requirements, effectively eliminating any security measures the TEE was designed to provide.

Various embodiments include methods, SoC designs, processing devices, and memory that are configured to implement the methods for providing improved security within an SoC. A secure subsystem that may operate independent of the application processor may be configured to receive, as inputs, indications and/or sensory information from a sensing framework, or a sensing circuit, relevant for determining whether conditions for performing cryptographic functions. The inputs may be used by the secure subsystem, independent of the cryptographic functions of the application processor, to affirm fulfilment of the criteria or conditions for usage of cryptographic keys and other cryptographic functions. The secure subsystem, in which the cryptographic keys are stored, may typically be a component with an attack service that is perceived to be the lowest within the SoC (i.e., lower than the application processor-based TEE). The high trust secure subsystem (e.g., a secure processing unit (SPU) or a highly isolated SoC root-of-trust (RoT)) may implement a cryptographic key usage policy that may deny authorization of a cryptographic key for performing, within the secure subsystem, a cryptographic function that is requested by an application processor or an application processor-based TEE, despite the application processor or application processor-based TEE being compromised.

Various embodiments may implement an independent key usage policy utilizing one or more conditions that must be satisfied in order to provide access to a cryptographic key and/or perform a cryptographic function requested by a service requesting environment (e.g., TEE). A service requesting environment may make a request to a secure subsystem to perform a security sensitive service, such as a cryptographic function. Authorization to execute the cryptographic function may be contingent on fulfilment of any number of conditions based on one or more inputs received by the secure subsystem from a sensing circuit. The sensing circuit may measure sensory information including user physical characteristics, camera image capture/feed information, device orientation, device location, device condition and physical status, device and connected device performance metrics, software performance metrics, and the like to determine if one or more conditions corresponding to a cryptographic service request have been satisfied. The sensing circuit may translate the raw signal data from the sensory information to inputs that may be utilized by the secure subsystem. The inputs may indicate whether a condition for performing a cryptographic function by the secure subsystem is or has been satisfied. The secure subsystem, which may store the cryptographic keys corresponding to the cryptographic service request, may determine whether one or more inputs indicates that the one or more conditions for performing the requested cryptographic function are satisfied. In response to determining that at least one of the condition(s) for a requested cryptographic function is satisfied, the secure subsystem may perform the requested cryptographic function, which may include authorizing usage of a cryptographic key corresponding to the requested cryptographic function.

This process flow of measuring sensory information by the sensing circuit, converting sensory information into inputs that indicate, or that can be used to determine, whether condition(s) precedent to performing a security sensitive service or cryptograph function are satisfied, and determining, by the secure subsystem, whether the input indicates that the condition(s) precedent for performing the requested cryptographic function is/are satisfied may be performed independent of any cryptographic operations being performed within the service requesting environment of the application processor. Thus, an additional layer of security is provided by the secure subsystem performing an independent process of verifying satisfaction of one or more conditions to a cryptographic function, which can function to restrict access to a cryptographic key in the event that the service requesting environment or TEE is compromised or corrupted.

FIG. 1 is a component block diagram illustrating an example computing system that may be configured to provide security in a SoC according to some embodiments. Various implementations may be implemented on a number of single processor and multiprocessor computer systems, including an SoC or a SIP. The example illustrated in FIG. 1 is a SIP 100 architecture that may be used in wireless devices and network devices implementing the various implementations.

With reference to FIG. 1, the illustrated example SIP 100 includes two SoCs 102, 104, a clock 106, a voltage regulator 108 and a wireless transceiver 166. In some implementations, the first SoC 102 may operate as central processing unit (CPU) of the wireless device that carries out the instructions of software application programs by performing the arithmetic, logical, control and input/output (I/O) operations specified by the instructions. In some implementations, the second SoC 104 may operate as a specialized processing unit. For example, the second SoC 104 may operate as a specialized 5G processing unit responsible for managing high volume, high speed (such as 5 Gbps, etc.), or very high frequency short wave length (such as 28 GHz mmWave spectrum, etc.) communications.

The first SoC 102 may include a digital signal processor (DSP) 110, a modem processor 112, a graphics processor 114, an application processor 116, one or more coprocessors 118 (such as vector co-processor) connected to one or more of the processors, memory 120, custom circuitry 122, system components and resources 124, an interconnection/bus module 126, one or more sensors 130, a sensor management unit 132, and a thermal power envelope (TPE) component 134. The second SoC 104 may include a 5G modem processor 152, a power management unit 154, an interconnection/bus module 164, a plurality of transceivers 156 (e.g., such as sub-6 band transceivers, mmWave transceivers or other wireless transceivers), memory 158, and various additional processors 160, such as an applications processor, packet processor, etc.

Each processor 110, 112, 114, 116, 118, 152, 160 may include one or more cores, and each processor/core may perform operations independent of the other processors/cores. For example, the first SoC 102 may include a processor that executes a first type of operating system (such as FreeBSD, LINUX, OS X, etc.) and a processor that executes a second type of operating system (such as MICROSOFT WINDOWS 10). In addition, any or all of the processors 110, 112, 114, 116, 118, 152, 160 may be included as part of a processor cluster architecture (such as a synchronous processor cluster architecture, an asynchronous or heterogeneous processor cluster architecture, etc.). In some implementations, any or all of the processors 110, 112, 114, 116, 118, 152, 160 may be a component of a processing system. A processing system may generally refer to a system or series of machines or components that receives inputs and processes the inputs to produce a set of outputs (which may be passed to other systems or components of, for example, the first SoC 102 or the second SoC 250). For example, a processing system of the first SoC 102 or the second SoC 104 may refer to a system including the various other components or subcomponents of the first SoC 102 or the second SoC 104.

The processing system of the first SoC 102 or the second SoC 104 may interface with other components of the first SoC 102 or the second SoC 104. The processing system of the first SoC 102 or the second SoC 104 may process information received from other components (such as inputs or signals), output information to other components, etc. For example, a chip or modem of the first SoC 102 or the second SoC 104 may include a processing system, a first interface to output information, and a second interface to receive information. In some cases, the first interface may refer to an interface between the processing system of the chip or modem and a transmitter, such that the first SoC 102 or the second SoC 104 may transmit information output from the chip or modem. In some cases, the second interface may refer to an interface between the processing system of the chip or modem and a receiver, such that the first SoC 102 or the second SoC 104 may receive information or signal inputs, and the information may be passed to the processing system. A person having ordinary skill in the art will readily recognize that the first interface also may receive information or signal inputs, and the second interface also may transmit information.

The first SoC 102 and the second SoC 104 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SoC 102 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 124 or custom circuitry 122 also may include circuitry to interface with peripheral devices, such as cameras, electronic displays, wireless communication devices, external memory chips, etc.

The first SoC 102 and the second SoC 104 may communicate via interconnection/bus module 150. The various processors 110, 112, 114, 116, 118, may be interconnected to one or more memory elements 120, system components and resources 124, and custom circuitry 122, and a sensor management unit 132 via an interconnection/bus module 126. Similarly, the modem processor 152 may be interconnected to the power management unit 154, the transceivers 156, memory 158, and various additional processors 160 via the interconnection/bus module 164. The interconnection/bus module 126, 150, 164 may include an array of reconfigurable logic gates or implement a bus architecture (such as CoreConnect, AMBA, etc.). Communications may be provided by advanced interconnects, such as high-performance networks-on chip (NoCs).

The first SoC 102 or the second SoC 104 may further include an input/output module (not illustrated) for communicating with resources external to the SoC, such as a clock 106 and a voltage regulator 108. Resources external to the SoC (such as clock 106, voltage regulator 108) may be shared by two or more of the internal SoC processors/cores.

In addition to the example SIP 100 discussed above, various implementations may be implemented in a wide variety of computing systems, which may include a single processor, multiple processors, multicore processors, or any combination thereof.

Figure 2:
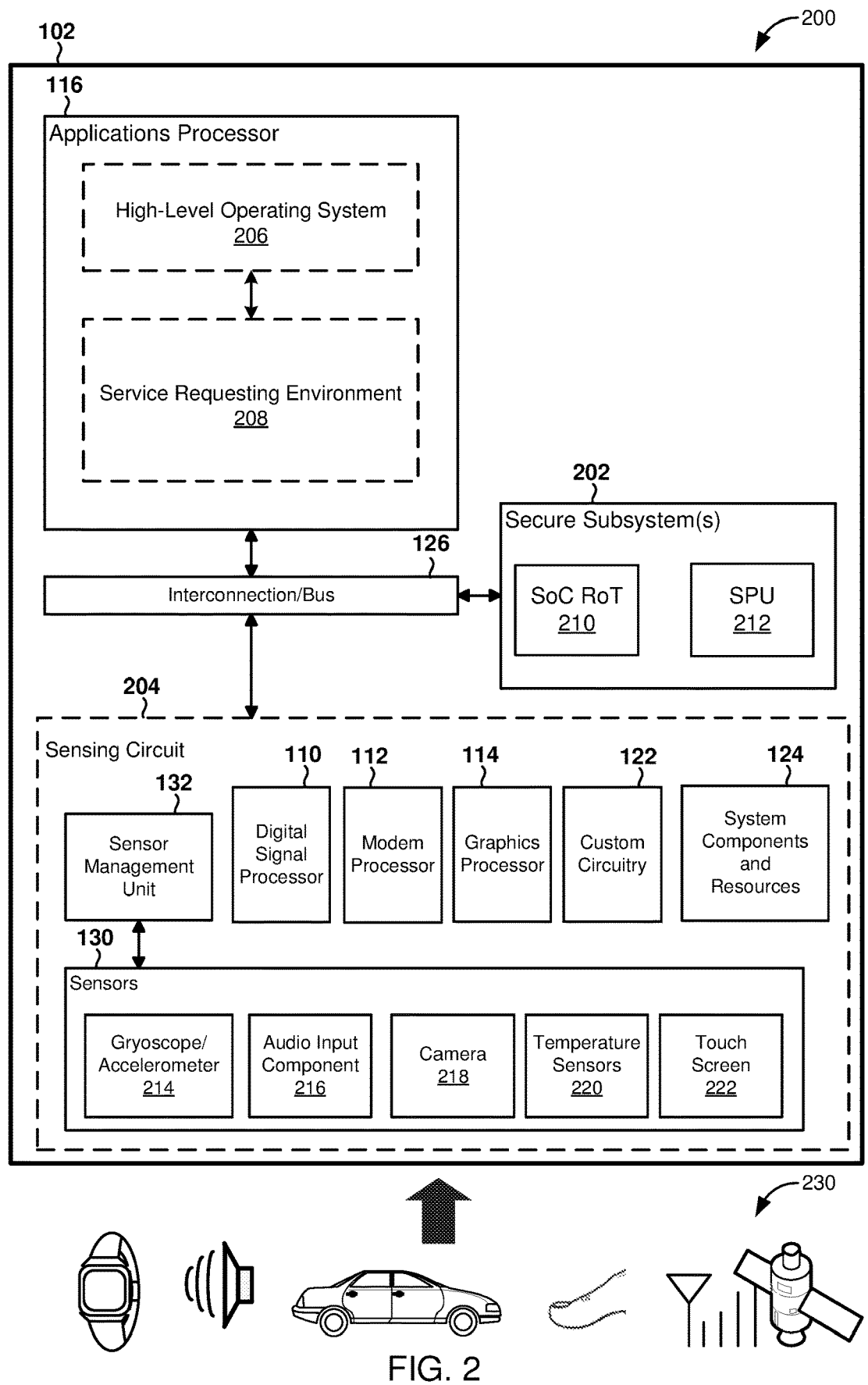
FIG. 2 is a component block diagram illustrating an example cryptographic system 200 for providing security in an SoC according to some embodiments.

FIG. 2 is a component block diagram illustrating an example SoC including a cryptographic system 200 suitable for implementing any of the various embodiments. The illustrated example cryptographic system 200 includes an applications processor 116, an interconnection/bus module 126, a secure subsystem 202, and a sensing circuit 204. The applications processor 116, the interconnection/bus module 126, the secure subsystem 202, and the sensing circuit 204 may be components of the SoC 102.

The sensing circuit 204 may receive or otherwise measure sensory information 230 that may be aggregated and communicated, via the interconnection/bus module 126, to the applications processor 116 and the secure subsystem 202. The applications processor 116 may transmit a request for a cryptographic function to the secure subsystem 202 via the interconnection/bus module 126. The secure subsystem 202 may be a functional block or a portion of the SoC 102 that is external to or otherwise independent from the applications processor 116. For example, the service requesting environment 208 may operate separately from the secure subsystem 202. The sensing circuit 204 may transmit inputs used for cryptographic authentication purposes separately to the applications processor 116 and the secure subsystem 202. The applications processor 116 may use received inputs to perform a cryptographic operation independently from the secure subsystem 202 using the received inputs to perform a separate cryptographic function, including authorizing use of a cryptographic key based on one or more conditions corresponding to the cryptographic function. The secure subsystem 202 may be configured to release, or authorize, the cryptographic key for use by the secure subsystem 202, in which the cryptographic key corresponds to the requested cryptographic function (i.e., requested by the service requesting environment) in response to received input indicating that the condition of the requested cryptographic function is satisfied.

The applications processor 116 may establish and manage a HLOS 206 and a service requesting environment 208. The service requesting environment 208 may be a virtual functional block, such as a Trusted Execution Environment (e.g., TrustZone, hypervisor-based virtual machine) for requesting the secure subsystem 202 to perform cryptographic functions.

The HLOS 206 may determine that a cryptographic function should be performed in response to a user input and/or request to gain access to secure information (e.g., online banking login through a banking application run on the applications processor 116). The access attempt may include a request for a cryptographic key to verify the user and/or device requesting access to the secure information. In response to an access attempt requesting additional security information including a cryptographic key, the HLOS 206 may generate and transmit a cryptographic service request including a requested cryptographic function to the service requesting environment 208. The service requesting environment 208 may then relay the cryptographic service request to the secure subsystem 202. The secure subsystem 202 may store cryptographic keys (e.g., store in the SPU 212) corresponding to any number of potential cryptographic functions. The secure subsystem 202 may authorize usage of or grant access to the cryptographic key corresponding to the cryptographic service request based on one or more conditions. Satisfying the conditions may authorize usage of the cryptographic key by the secure subsystem 202 to perform the cryptographic function requested by the cryptographic service request, in which the cryptographic service request was originally generated by the HLOS 206 to allow access to the requested secure information. The secure subsystem 202 may deny authorization to use the cryptographic key(s) to perform a cryptographic function in response to determining that one or more of the conditions associated with the cryptographic service request are not satisfied, and thus may deny access to the secure information corresponding to the cryptographic service request.

In some embodiments, the secure subsystem 202 may include a memory or may be communicably connected through the interconnection/bus module 126 to a memory device (e.g., memory 120, memory device external to the SoC 102) for storing various conditions for performing various cryptographic functions. In some embodiments, the secure subsystem 202 may store a cryptographic key usage policy utilizing one or more conditions that must be satisfied in order to provide access to a cryptographic key and/or perform a cryptographic function requested by the service requesting environment 208. For example, the secure subsystem 202 may store a set of rules and/or conditions corresponding to requests to perform various cryptographic functions. The key usage policy stored by the secure subsystem 202 may include the conditions that must be satisfied for each requested cryptographic function, rules for determining which conditions must be satisfied based on a requested cryptographic function, and rules for determining which of the conditions are satisfied based on inputs received from the sensing circuit 204. In some embodiments, a cryptographic service request may include one or more conditions to be satisfied in addition to a cryptographic function.

The sensing circuit 204 may include the digital signal processor 110, the modem processor 112, the graphics processor 114, the custom circuitry 122, and the system components and resources 124 to analyze conditions related to the operation of each processor. For example, the modem processor 112 may analyze the bandwidth range at which the device including the SoC 102 is operating (e.g., 5G, LTE, etc.). The sensing circuit 204 may include additional processors for measuring operating conditions of a device implementing the SoC 102, in which each processor may be communicably connected to the secure subsystem 202 through the interconnection/bus module 126. In some embodiments, the SoC 102 may include additional processors that are separate from the sensing circuit 204, but may transmit device operating conditions to the sensing circuit 204. The sensing circuit 204 may include a sensor management unit 132 communicably connected to any variety of sensors 130 for measuring real world sensory information 230. The sensors 130 may include a gyroscope/accelerometer 214, an audio input component 216, a camera 218, temperature sensors 220, and a touch screen 222, among other sensors for measuring and/or receiving real world data.

In some embodiments, the sensing circuit 204 may determine whether conditions associated with cryptographic service requests are satisfied for purposes of the secure subsystem 202 authorizing usage of a cryptographic key. The sensing circuit 204 may determine that one or more conditions associated with a cryptographic service request are satisfied by analyzing sensory information 230. The sensing circuit 204 may measure and/or analyze sensory information 230 to generate inputs that may be utilized by the secure subsystem 202. The sensing circuit 204 may transmit the inputs based on the measured sensory information 230 to the secure subsystem 202 via the interconnection/bus module 126. The secure subsystem 202 may receive an input from the sensing circuit 204 relevant to one or more conditions for performing a cryptographic function using the cryptographic key. The secure subsystem 202 may perform a requested cryptographic function in response to the received input indicating that one or more conditions of the requested cryptographic function is satisfied.

In some embodiments, the secure subsystem may 202 may determine whether conditions associated with cryptographic service requests are satisfied for purposes of granting access to or authorizing usage of a cryptographic key by the secure subsystem 202 (or performing another cryptographic function). The secure subsystem 202 may determine that one or more conditions associated with a cryptographic service request are satisfied by analyzing inputs from the sensing circuit 204. The sensing circuit 204 may measure and/or analyze sensory information 230 to generate inputs to the secure subsystem 202. The sensing circuit 204 may transmit the inputs based on the measured sensory information 230 to the secure subsystem 202 via the interconnection/bus module 126. The secure subsystem 202 may receive an input from the sensing circuit 204 relevant to one or more conditions for performing a cryptographic function using the cryptographic key. The secure subsystem 202 may perform a requested cryptographic function in response to the received input indicating that one or more conditions of the requested cryptographic function is satisfied.

The term "input" is used herein to refer to a variety of data structures that may be received by the secure subsystem, including for example raw sensor data, sensor measurement values, Boolean information, flag bits, and the like.

As an example, in embodiments in which the sensing circuit 204 determines whether one or more conditions corresponding to a cryptographic service request are satisfied, the sensing circuit 204 may generate one or more Booleans corresponding to one or more conditions, and convey the Booleans to the secure subsystem 202, such as loading a bit into a register accessible by the secure subsystem 202. For example, a Boolean may be a 1 (or "yes") or 0 (or "no") indicator that can be loaded into a register within or accessed by the secure subsystem and corresponding to a specific sensor (e.g., thumbprint detected="yes/no", valid thumbprint detected="yes/no") or indication that a specific condition is satisfied or not. The secure subsystem can then access the flag or Boolean to determine whether it should proceed with authorizing access to a cryptographic key. In embodiments in which the inputs are Boolean values representing statuses measured by the sensors 130 (e.g., whether a watch is detected, whether temperature is too high, whether a QR code detected, etc.), a processor within the secure subsystem 202 may determine whether the status indicated by each input indicates that the corresponding condition is satisfied before authorizing usage of a cryptographic key.

In embodiments in which inputs to the secure subsystem includes one or more Booleans, the sensing circuit 204 may pass data to the secure subsystem 202 including the Boolean, may set a flag or bit corresponding to the Boolean status in a register that the secure subsystem 202 has access to (e.g., a flag/bit within the SPU 212), and/or may push a byte stored in a register over interconnection/bus module 126 to a memory address range of the secure subsystem 202. For example, the sensing circuit 204 may output to the secure subsystem 202 a Boolean value indicating that a device implementing the SoC 102 has measured and recorded sensory information 230 indicating an authorized key fob is present (e.g., key fob present and determination block 306="Yes"). The secure subsystem 202, based on the input, may determine that the presence of the key fob indicates that the condition is satisfied and that the secure subsystem 202 may authorize usage of the cryptographic key corresponding to the cryptographic service request to allow the secure subsystem 202 to perform the requested cryptographic function.

In embodiments in which the secure subsystem 202 determines whether one or more conditions corresponding to a cryptographic service request are satisfied, the secure subsystem 202 may receive raw signal measurements from the sensing circuit 204 as inputs, process one or more raw signal measurements, and determine based on this processing of raw signal measurements whether one or more conditions for a requested cryptographic function are satisfied.

The inputs received by the secure subsystem 202 from the sensing circuit 204 may be always-on information (i.e., information measured by sensors is continuously pushed to the secure subsystem 202) or operating sensor information, such as values stored in a register of or accessible by the secure subsystem 202, and thus available for determining whether a condition precedent is satisfied upon receiving a request (e.g., from the TEE) for a cryptographic function. In other words, the sensing circuit 204 may continuously output (e.g., transmit via a data bus or store in memory accessible by the secure subsystem 202) sensor information or indication related to one or more conditions precedent so that the information or indication is always available to the secure subsystem. Thus, when receiving a cryptographic service request including a cryptographic function from the service requesting environment 208, the secure subsystem 202 may already have a status or indication of an input corresponding to one or more conditions required by the cryptographic service request that need to be fulfilled to grant access to the cryptographic key and complete the cryptographic function. For example, the sensing circuit 204 may continually set a bit or flag in a register accessible by the secure subsystem 202 indicating a Boolean value of "user watch detected=no" so long as a smartwatch watch corresponding to an authorized user is not within detectable Bluetooth Low Energy (BLE) range. When the smartwatch of a valid user comes into BLE range and connects to the device implementing the SoC 102, the sensing circuit 204 may adjust the corresponding register to indicate a Boolean value of "user watch detected=yes" and continually push or maintain this value accessible by the secure subsystem 202 while the smartwatch remains in range.

In some embodiments, the sensing circuit 204 may provide an input to the secure subsystem 202 when the sensing circuit 204 determines that a change in the inputs is appropriate based on the conditions set and the measured sensory information 230. For example, a condition to a particular cryptographic function may be whether a device implementing the SoC 102 is moving faster than a specific velocity threshold range. By default, while the device is within the velocity threshold range (e.g., not moving), the input to the secure subsystem 202 as initially provided (e.g., at system boot) by the sensing circuit 204 using the gyroscope/accelerometer 214 may be "device stable=yes". The sensing circuit 204 may not waste processor cycles by continually pushing "device stable=yes" to the secure subsystem 202 until that condition changes. Thus, when the sensing circuit 204 determines that the sensory information 230 indicates the device is moving faster than the threshold velocity range as defined by the condition, the input may be changed to "device stable=no" and the sensing circuit 204 may push this Boolean to the secure subsystem 202 or set a flag bit in a register accessible by the secure subsystem 202.

In some embodiments, the secure subsystem 202 may receive a request to perform a cryptographic function and, in response, the secure subsystem may request a most recent value or status of a condition corresponding to the requested cryptographic function. For example, the sensing circuit 204 may provide inputs and/or sensory information to the secure subsystem 202 in intervals, and the secure subsystem 202 may not have the latest information related to determining whether a condition of a requested cryptographic function is satisfied. Thus, the secure subsystem may transmit a request to the sensing circuit 204 to provide the latest status or input related to that condition to the secure subsystem 202. In some embodiments, the secure subsystem 202 may store the inputs related to satisfying any condition within the key usage policy, but may make a determination as to whether the inputs satisfy a condition corresponding to a cryptographic service request after receiving the cryptographic service request. In some embodiments, the secure subsystem 202 may determine and store information regarding which conditions in the key usage policy have been satisfied based on the latest inputs, regardless of whether a cryptographic service request has been received by the secure subsystem 202.

In some embodiments, the sensing circuit 204 may be a component of another SoC other than the SoC 102 (e.g., SoC 104) or may be another component of another device external to the device housing the SoC 102. For example, the sensing circuit 204 may be a functional block that is part of another device such as a smartphone or smartwatch that may measure sensory information 230 to determine and aggregate inputs based on conditions, and may then transmit those determined inputs to a device implementing the secure subsystem 202 (e.g., via the wireless transceiver 166). Similarly, in some embodiments, the secure subsystem 202 may be a component of another SoC other than the SoC 102 or may be another component of another device external to the device housing the SoC 102.

In some embodiments, the secure subsystem 202 may include the SoC RoT 210, and all operations described as being performed by the secure subsystem 202 may be performed by the SoC RoT 210. In some embodiments, the secure subsystem 202 may include the SPU 212, and all operations described as being performed by the secure subsystem 202 may be performed by the SPU 212. In some embodiments, the secure subsystem 202 may include a SoC root-of-trust (RoT) 210 and a secure processing unit (SPU) 212, and all operations described as being performed by the secure subsystem 202 may be performed by the SoC RoT 210 in conjunction with the SPU 212. Thus, in various embodiments, all operations described throughout this document as being performed by the secure subsystem 202 may be performed solely by the SoC RoT 210, solely by the SPU 212, or jointly by the SoC RoT 210 and the SPU 212. As an example in which the SoC RoT 210 and SPU 212 function as two jointly-functioning components within the secure subsystem 202, the SPU 212 may be an independent processor subsystem and boot chain including a CPU, memory, and cryptographic engine to provide cryptographic services to other subsystems. The SPU 212 may store one or more cryptographic keys and may receive one or more requested cryptographic functions from the service requesting environment 208. The SoC RoT 210 may be configured to receive the input from the sensing circuit 204 and to determine whether the input indicates that the condition for performing the requested cryptographic function is satisfied. The SoC RoT 210 may transmit the inputs to the SPU 212. The SPU 212 may be configured to perform the requested cryptographic function in response to the received input indicating that the condition of the requested cryptographic function is satisfied. The SPU 212 may therefore authorize usage of a cryptographic key corresponding to a requested cryptographic function to the secure subsystem 202 when the sensing circuit 204 or the secure subsystem 202 determines a condition corresponding to the requested cryptographic function is satisfied.

The sensing circuit 204 may measure a variety of sensory information 230 using a variety of sensors 130 and the digital signal processor 110, the modem processor 112, the graphics processor 114, the custom circuitry 122, and the system components and resources 124 to analyze conditions related to the operation of each processor for purposes of determining and aggregating inputs based on preset conditions. The sensory information 230 may include any variety of external device stimuli, signals, indicators, or the like. For example, the sensing circuit 204 may measure and record user physical characteristics, image-capture and/or image-feed data, device orientation, device location, device condition and/or status, communications network information, and other information that may be used (i.e., determine if condition(s) satisfied) in identification of an authorized and/or valid user, credentials, connections, connected devices, conditions, or the like for cryptographic security purposes.

Figure 3:
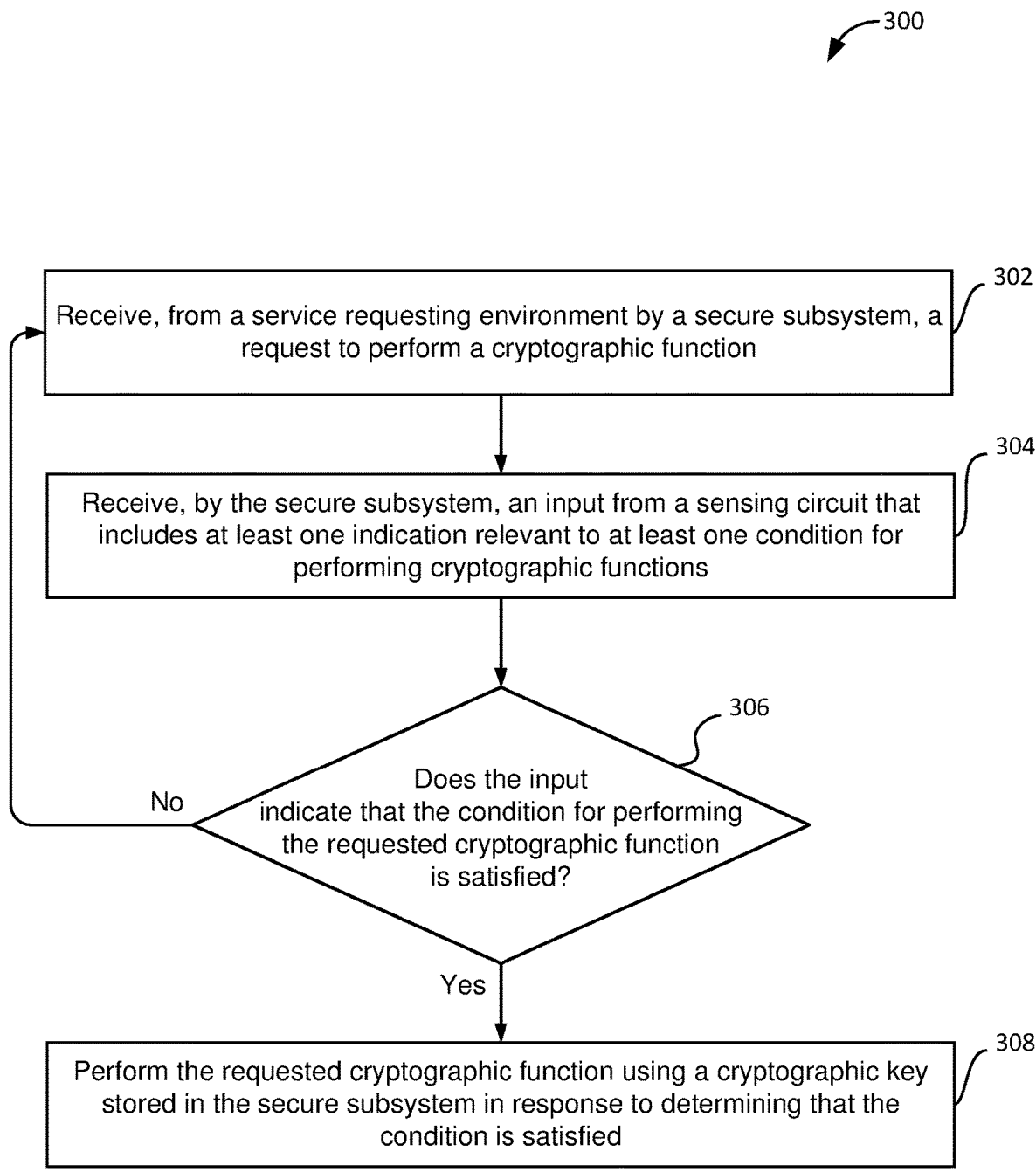
FIG. 3 is a process flow diagram illustrating an embodiment method for providing security within an SoC according to various embodiments.

FIG. 3 is a process flow diagram illustrating an embodiment method 300 for providing security within an SoC according to various embodiments. With reference to FIGS. 1-3, the method 300 may be implemented in a processor (e.g., processors 110, 112, 114, 116, 118, 152, 160) configured to perform operations of the method. In some embodiments, the processor (e.g., processors 110, 112, 114, 116, 118, 152, 160) may be configured to perform the operations by processor-executable instruction stored in a non-transitory processor-readable medium (e.g., memory devices 120, 158). Means for performing each of the operations of the method 300 may be a processor of the cryptographic system 200, such as the processors 110, 112, 114, 116, 118, 152, 160, the secure subsystem 202, the sensing circuit 204, and/or the like.

In various embodiments, the secure subsystem (e.g., secure subsystem 202) may store one or more cryptographic keys of which the secure subsystem does not have immediate access to. For example, the secure subsystem may receive the request to perform a cryptographic function from the service requesting environment (e.g., service requesting environment 208) via an interconnect (e.g., interconnection/bus module 126). The service requesting environment may be a TEE operating on and managed by an application processor (e.g., application processor 116).

In block 302, a secure subsystem may receive a request to perform a cryptographic function from a service requesting environment. The secure subsystem may store a condition for performing the requested cryptographic function. The secure subsystem may require satisfaction of the condition prior to granting access to or authorizing usage of a cryptographic key by the secure subsystem. In some embodiments, receiving, by the secure subsystem, the request for the cryptographic function from the service requesting environment may include receiving the request for the cryptographic function from the service requesting environment by an SPU (e.g., SPU 212) or an SoC RoT (e.g., SoC RoT 210) within the secure subsystem. The processes in block 302 may be performed as described with reference to FIGS. 1 and 2. Means for performing the operations in block 302 may include a processor of the cryptographic system, such as the processors 110, 112, 114, 116, 118, 152, 160, the secure subsystem 202, the sensing circuit 204, and/or the like.

In block 304, a secure subsystem may receive an input from a sensing circuit, in which the input includes at least one indication relevant to at least one condition for performing cryptographic functions. The secure subsystem (e.g., secure subsystem 202) may receive one or more inputs from a sensing circuit (e.g., sensing circuit 204). The inputs may be based on sensory information (e.g., sensory information 230). The sensing circuit may determine whether conditions are satisfied based on the sensory information. In some embodiments, the secure subsystem may receive the inputs from the sensing circuit and may then determine whether conditions are satisfied based on the received inputs. In some embodiments, the receiving the input from the sensing circuit may include receiving a Boolean value indicating whether the condition for performing the requested cryptographic function is satisfied. In some embodiments, the input may be always-on information, or operating sensor information, and receiving the input from the sensing circuit may further include the secure subsystem continuously receiving the input from the sensing circuit. In some embodiments, receiving the input from the sensing circuit may include the secure subsystem receiving the input from the sensing circuit along a communication path that is independent from the service requesting environment. In some embodiments, receiving, by the secure subsystem, the input from the sensing circuit may include receiving the input from the sensing circuit by an SoC RoT (e.g., 210) or an SPU (e.g., SPU 212) within the secure subsystem. The processes in block 304 may be performed as described with reference to FIGS. 1 and 2. Means for performing the operations in block 304 may include a processor of the cryptographic system, such as the processors 110, 112, 114, 116, 118, 152, 160, the secure subsystem 202, the sensing circuit 204, and/or the like.

In determination block 306, the secure subsystem may determine whether the input indicates that the condition for performing the requested cryptographic function is satisfied. The secure subsystem (e.g., secure subsystem 202) may determine whether the input received from the sensory circuit indicates that one or more conditions corresponding to the requested cryptographic function have been satisfied for purposes of authorizing usage of one or more cryptographic keys by the secure subsystem for performing the requested cryptographic function. In some embodiments, determining, by the secure subsystem, whether the input indicates that the condition for performing the requested cryptographic function is satisfied may include determining, by the SoC RoT (e.g., SoC RoT 210) and/or the SPU (e.g., SPU 212), whether the input indicates that the condition for performing the requested cryptographic function is satisfied. The processes in determination block 306 may be performed as described with reference to FIGS. 1 and 2. Means for performing the operations in determination block 306 may include a processor of the cryptographic system, such as the processors 110, 112, 114, 116, 118, 152, 160, the secure subsystem 202, the sensing circuit 204, and/or the like.

In response to determining that the input indicates that the condition for performing the requested cryptographic function is not satisfied (i.e., determination block 306="No"), the secure subsystem may deny usage of the cryptographic key corresponding to the requested cryptographic function, and the requested cryptographic function may be terminated or rejected. The secure subsystem may continue to receive a subsequent attempt of the same request for a cryptographic function and/or additional requests for cryptographic functions as described in block 302 until the secure subsystem determines that the input indicates that the condition for performing the requested cryptographic function is satisfied.

In response to determining that the input indicates that the condition for performing the requested cryptographic function is satisfied (i.e., determination block 306="Yes"), the requested cryptographic function may be performed in block 308. Upon the secure subsystem determining that one or more requisite conditions are satisfied as indicated by the input received from the sensing circuit, the secure subsystem may authorize usage of one of more cryptographic keys to allow the secure subsystem to complete the requested cryptographic function. In an embodiment, performing the requested cryptographic function in response to determining that the condition is satisfied may include performing the requested cryptographic function by the SPU and/or the SoC RoT in response to determining that the condition is satisfied, such that the SPU and/or the SoC RoT may authorize the SPU and/or the SoC RoT to use a cryptographic key. The processes in block 308 may be performed as described with reference to FIGS. 1 and 2. Means for performing the operations in block 308 may include a processor of the cryptographic system, such as the processors 110, 112, 114, 116, 118, 152, 160, the secure subsystem 202, the sensing circuit 204, and/or the like.

The inputs received from the sensing circuit 204 in block 304 and the determination made by the secure subsystem 202 in determination block 306 may enable various embodiments to condition execution of cryptographic functions and access to cryptographic keys upon a wide variety of parameters and factors to address a variety of cryptographic function application. Non-limiting examples of inputs, determinations and conditions for various cryptographic functions in blocks 302-308 include the following.

In some embodiments, the sensing circuit 204 may measure physical characteristics of a proximate, present user. The sensing circuit 204 may determine, based on the measured sensory information 230, whether one or more conditions are satisfied, such as whether a person is within a proximate range to physically operate a device including the secure subsystem that received a cryptographic service request from the service requesting environment 208. The resulting determination of whether the condition is satisfied, in this example embodiment, whether the input includes an indication of a physical presence of the person within the proximate range to the device containing the SoC 102, may be input to the secure subsystem 202 in block 304. The sensing circuit 204 may determine, based on the measured sensory information 230, whether one or more conditions are satisfied, such as whether the user is an authorized user corresponding to a cryptographic service request received by the secure subsystem 202 from the service requesting environment 208. The resulting determination of whether the condition is satisfied, in this case, whether the present user of the device implementing the SoC 102 is an authorized user, may be input to the secure subsystem 202 in block 304.

The sensing circuit 204 may generate an input indicating that a condition is or is not satisfied and/or indicating that a present user is an authorized user of the device implementing the SoC 102. In other words, the input received in block 304 may include an indication of present user physical characteristics of a user of a device containing the SoC 102, the condition may be whether the user physical characteristics match authorized user physical characteristics, and the secure subsystem 202 may be configured to determine whether the condition is met.

For example, in response to a cryptographic service request attempting to gain access to secure information, the applications processor 116 may initiate a fingerprint identification process, in which the device may request, via a user interface, and measure, via the touch screen 222, a fingerprint. The condition may be whether the user fingerprint matches an authorized user fingerprint (e.g., stored by the device or external memory such as an authentication server), the input received in block 304 may include an indication of a present user fingerprint (e.g., whether a fingerprint matches stored authorized user fingerprint), and the secure subsystem 202 may be configured to determine whether the condition is met. If the fingerprint matches a stored fingerprint (e.g., fingerprint matches stored authorized user fingerprint and determination block 306="Yes"), the secure subsystem 202 may authorize usage of a cryptographic key corresponding to the cryptographic service request allow the secure subsystem 202 to complete the cryptographic function. If the fingerprint does not match a stored fingerprint (e.g., fingerprint matches stored authorized user fingerprint and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate an iris identification process, in which the device may request, via a user interface, and measure, via the camera 218, an image of an iris of a user. The condition may be whether the user's iris matches an authorized user iris (e.g., stored by the device or external memory such as an authentication server). In that case, the input received in block 304 may include an indication of a present user iris (e.g., iris matches stored authorized user iris and determination block 306="Yes" or "No"), and the secure subsystem 202 may be configured to determine whether the condition is met. If the iris matches a stored iris (e.g., iris matches stored authorized user iris and determination block 306="Yes"), the secure subsystem 202 may authorize usage of a cryptographic key corresponding to the cryptographic service request to allow the secure subsystem 202 to complete the cryptographic function. If the iris does not match a stored iris (e.g., iris matches stored authorized user iris and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a facial recognition process, in which the device may request, via a user interface, and measure, via the camera 218, an image of a face of a user. The condition may be whether the user face matches an authorized user face (e.g., stored by the device or external memory such as an authentication server), the input received in block 304 may include an indication of a present user face (e.g., whether the face matches a stored authorized user face and determination block 306="Yes" or "No"), and the secure subsystem 202 may be configured to determine whether the condition is met. If the face matches a stored face (e.g., face matches stored authorized user face and determination block 306="Yes"), the secure subsystem 202 may authorize usage of a cryptographic key corresponding to the cryptographic service request to allow the secure subsystem 202 to complete the cryptographic function. If the face does not match a stored face (e.g., face matches stored authorized user face and determination block 306="No"), the secure subsystem 202 may not authorize usage of a cryptographic key corresponding to the cryptographic service request, and the cryptographic service request may fail and access to secure information may be denied.

As a further example, in response to a cryptographic service request attempting to gain access to secure information, the applications processor 116 may initiate a facial recognition process, in which the device may request, via a user interface, and measure, via the audio input component 216, a recording of a voice of a user. The condition may be whether the user voice recording matches an authorized user voice recording (e.g., stored by the device or external memory such as an authentication server), the input received in block 304 may include an indication of a present user voice recording (e.g., whether voice recording matches stored authorized user voice recording), and the secure subsystem 202 may be configured to determine whether the condition is met. If the voice recording matches a stored voice recording (e.g., voice recording matches stored authorized user voice recording and determination block 306="Yes"), the secure subsystem 202 may authorize usage of a cryptographic key corresponding to the cryptographic service request to allow the secure subsystem 202 to complete the cryptographic function. If the voice recording does not match a stored voice recording (e.g., voice recording matches stored authorized user voice recording and determination block 306="No"), the secure subsystem 202 may not authorize usage of a cryptographic key corresponding to the cryptographic service request, and the cryptographic service request may fail and access to secure information may be denied.

In some embodiments, the sensing circuit 204 may measure additional, non-user related environmental conditions or image-capture/feed features using the camera 218. For example, in response to a cryptographic service request attempting to gain access to secure information, the applications processor 116 may initiate an image identification process such as identifying a specific QR reader code, in which the device may request, via a user interface, and measure, via the camera 218, an image of a QR code. The condition may be whether the QR code matches a specific QR code (e.g., stored by the device or external memory such as an authentication server), the input received in block 304 may include an indication of a present QR code (e.g., whether a QR code matches stored valid QR code), and the secure subsystem 202 may be configured to determine whether the condition is met. If the QR code matches a stored QR code (e.g., QR code matches stored QR code and determination block 306="Yes"), the secure subsystem 202 may authorize usage of a cryptographic key corresponding to the cryptographic service request to allow the secure subsystem 202 to complete the cryptographic function. If the QR code does not match a stored QR code (e.g., QR code matches stored QR code and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate an image identification process such as identifying a specific environmental brightness level, in which the device may measure, via the camera 218, a current brightness level. The condition may be whether the brightness level is within a brightness level threshold range (e.g., stored by the device or external memory such as an authentication server), the input received in block 304 may include an indication of a present brightness level (e.g., whether brightness level is within brightness level threshold range), and the secure subsystem 202 may be configured to determine whether the condition is met. If the brightness level is within the brightness level threshold range (e.g., brightness level is within brightness level threshold range and determination block 306="Yes"), the secure subsystem 202 may authorize usage of a cryptographic key corresponding to the cryptographic service request to allow the secure subsystem 202 to complete the cryptographic function. If the brightness level is not within the brightness level threshold range (e.g., brightness level is within brightness level threshold range and determination block 306="No"), the secure subsystem 202 may not authorize usage of a cryptographic key corresponding to the cryptographic service request, and the cryptographic service request may fail and access to secure information may be denied.

In some embodiments, the sensing circuit 204 may measure device orientation of a device implementing the SoC 102. The sensing circuit 204 may determine, based on the measured sensory information 230, whether one or more conditions are satisfied, such as whether the device is within a proper orientation corresponding to a cryptographic service request received by the secure subsystem 202 from the secure virtual environment 208. The resulting determination of whether the condition is satisfied, in this case, whether the device implementing the SoC 102 is within a proper orientation, may be input to the secure subsystem 202.

The sensing circuit 204 may generate an input indicating that a condition is or is not satisfied and/or indicating that a present user is an authorized user of the device implementing the SoC 102. In other words, the input received in block 304 may include an indication of a device orientation of a device including the SoC 102, the condition may be whether the device orientation is within acceptable thresholds, and the secure subsystem 202 may be configured to determine whether the condition is met.

For example, in response to a cryptographic service request attempting to gain access to secure information, the applications processor 116 may initiate a device orientation measurement process in which the device may measure, via the gyroscope/accelerometer 214, an x-y-z axis orientation. The condition may be whether the x-y-z axis orientation is within an x-y-z axis orientation threshold range (e.g., stored by the device or external memory such as an authentication server), the input received in block 304 may include an indication of a present x-y-z axis orientation (e.g., whether x-y-z axis orientation is within x-y-z axis orientation threshold range), and the secure subsystem 202 may be configured to determine whether the condition is met. If the x-y-z axis orientation is within the x-y-z axis orientation threshold range (e.g., x-y-z axis orientation is within x-y-z axis orientation threshold range and determination block 306="Yes"), the secure subsystem 202 may authorize usage of a cryptographic key corresponding to the cryptographic service request to allow the secure subsystem 202 to complete the cryptographic function. If the x-y-z axis orientation is not within the x-y-z axis orientation threshold range (e.g., x-y-z axis orientation is within x-y-z axis orientation threshold range and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device orientation measurement process in which the device may measure, via the gyroscope/accelerometer 214, a tilt angle. The condition may be whether the tilt angle is within a tilt angle threshold range (e.g., stored by the device or external memory such as an authentication server), the input received in block 304 may include an indication of a present tilt angle (e.g., whether tilt angle is within tilt angle threshold range), and the secure subsystem 202 may be configured to determine whether the condition is met. If the tilt angle is within the tilt angle threshold range (e.g., tilt angle is within tilt angle threshold range and determination block 306="Yes"), the secure subsystem 202 may authorize usage of a cryptographic key corresponding to the cryptographic service request to allow the secure subsystem 202 to complete the cryptographic function. If the tilt angle is not within the tilt angle threshold range (e.g., tilt angle is within tilt angle threshold range and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device orientation measurement process in which the device may measure, via the gyroscope/accelerometer 214, a velocity. The condition may be whether the velocity is within a velocity threshold range (e.g., stored by the device or external memory such as an authentication server), the input received in block 304 may include an indication of a present velocity (e.g., whether velocity is within velocity threshold range), and the secure subsystem 202 may be configured to determine whether the condition is met. If the velocity is within the velocity threshold range (e.g., velocity is within velocity threshold range and determination block 306="Yes"), the secure subsystem 202 may authorize usage of a cryptographic key corresponding to the cryptographic service request to allow the secure subsystem 202 to complete the cryptographic function. If the velocity is not within the velocity threshold range (e.g., velocity is within velocity threshold range and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device orientation measurement process in which the device may measure, via the gyroscope/accelerometer 214, an acceleration. The condition may be whether the acceleration is within an acceleration threshold range (e.g., stored by the device or external memory such as an authentication server), the input received in block 304 may include an indication of a present acceleration (e.g., whether acceleration is within acceleration threshold range), and the secure subsystem 202 may be configured to determine whether the condition is met. If the acceleration is within the acceleration threshold range (e.g., acceleration is within acceleration threshold range and determination block 306="Yes"), the secure subsystem 202 may authorize usage of a cryptographic key corresponding to the cryptographic service request to allow the secure subsystem 202 to complete the cryptographic function. If the acceleration is not within the acceleration threshold range (e.g., acceleration is within acceleration threshold range and determination block 306="No"), the secure subsystem 202 may not authorize usage of a cryptographic key corresponding to the cryptographic service request, and the cryptographic service request may fail and access to secure information may be denied.

In some embodiments, the sensing circuit 204 may measure location of a device implementing the SoC 102. The sensing circuit 204 may determine, based on the measured sensory information 230, whether one or more conditions are satisfied, such as whether the device is within a secure environment or geographical location corresponding to a cryptographic service request received by the secure subsystem 202 from the secure virtual environment 208. The resulting determination of whether the condition is satisfied, in this case, whether the device is in a specific location, may be input to the secure subsystem 202.

The sensing circuit 204 may generate an input indicating that a condition is or is not satisfied and/or indicating that a device implementing the SoC 102 is within an authorized location. The input received in block 304 may include an indication of a present device location of a device including the SoC 102, the condition may be whether the device location is in an authorized location, and the secure subsystem may be configured to determine whether the condition is met. The input received in block 304 may also include an indication of a proximate device capable of connecting to a device including the SoC 102, the condition may be whether the proximate device is an authorizing device, and the secure subsystem may be configured to determine whether the condition is met.

For example, in response to a cryptographic service request attempting to gain access to secure information, the applications processor 116 may initiate a device location determination process in which the device may determine, via geopositioning methods, a geopositioned location. The condition may be whether the geopositioned location is within an authorized geopositioned location (e.g., one or more locations stored by the device or external memory such as an authentication server), the input received in block 304 may include an indication of a present geopositioned location (e.g., whether geopositioned location is within an authorized geopositioned location), and the secure subsystem 202 may be configured to determine whether the condition is met. If the geopositioned location is within an authorized geopositioned location (e.g., geopositioned location is within an authorized geopositioned location and determination block 306="Yes"), the secure subsystem 202 may authorize usage of a cryptographic key corresponding to the cryptographic service request to allow the secure subsystem 202 to complete the cryptographic function. If the geopositioned location is not within an authorized geopositioned location (e.g., geopositioned location is within an authorized geopositioned location and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device location determination process to determine if another authentication device is proximate. For example, the device implementing the SoC 102 may determine if a smartwatch, car operating system, radio frequency identification (RFID) tag, key fob of an authorized user, or the like may be within communication distance. The condition may be whether the authentication device is proximate to or otherwise in communication range with the device implementing the SoC 102 (e.g., one or more authentication device IDs stored by the device or external memory such as an authentication server), the input received in block 304 may include an indication of authentication device proximity (e.g., whether authentication device is proximate), and the secure subsystem 202 may be configured to determine whether the condition is met. If the authentication device is proximate to the device implementing the SoC 102 (e.g., authentication device is proximate and determination block 306="Yes"), the secure subsystem 202 may authorize usage of a cryptographic key corresponding to the cryptographic service request to allow the secure subsystem 202 to complete the cryptographic function. If the authentication device is not proximate to the device implementing the SoC 102 (e.g., authentication device is proximate and determination block 306="No"), the secure subsystem 202 may not authorize usage of a cryptographic key corresponding to the cryptographic service request, and the cryptographic service request may fail and access to secure information may be denied.

The sensing circuit 204 may generate an input indicating that a condition is or is not satisfied and/or indicating that authorized networks may be detectable and visible by the device implementing the SoC 102. For example, the input received in block 304 may include an indication of a communication network detected by a device including the SoC 102, the condition may be whether the communication network matches an authorized communication network, and the secure subsystem may be configured to determine whether the condition is met.

For example, in response to a cryptographic service request attempting to gain access to secure information, the applications processor 116 may initiate a device location determination process in which the device may determine currently visible networks (e.g., WAN/LAN that the device is capable of connecting to). The condition may be whether the visible networks are authorized networks (e.g., one or more networks stored by the device or external memory such as an authentication server), the input received in block 304 may include an indication of present visible networks (e.g., whether visible networks match authorized networks), and the secure subsystem 202 may be configured to determine whether the condition is met. If the visible networks match authorized networks (e.g., visible networks match authorized networks and determination block 306="Yes"), the secure subsystem 202 may authorize usage of a cryptographic key corresponding to the cryptographic service request to allow the secure subsystem 202 to complete the cryptographic function. If the visible networks do not match authorized networks (e.g., visible networks match authorized networks and determination block 306="No"), the secure subsystem 202 may not authorize usage of a cryptographic key corresponding to the cryptographic service request, and the cryptographic service request may fail and access to secure information may be denied.

In some embodiments, the sensing circuit 204 may measure conditions, physical statuses, and performance metrics of the device implementing the SoC 102. For example, in response to a cryptographic service request attempting to gain access to secure information, the applications processor 116 may initiate a device condition measurement process in which the device may measure, via the temperature sensors 220, a temperature. The temperature sensors 220 may measure one or more temperatures internal to the device (e.g., processor core temperatures via a scan chain) or external to the device (e.g., environmental temperatures. The condition may be whether the temperature is within a temperature threshold range (e.g., stored by the device or external memory such as an authentication server), the input received in block 304 may include an indication of a present temperature (e.g., whether temperature is within temperature threshold range), and the secure subsystem 202 may be configured to determine whether the condition is met. If the temperature is within the temperature threshold range (e.g., temperature is within temperature threshold range and determination block 306="Yes"), the secure subsystem 202 may authorize usage of a cryptographic key corresponding to the cryptographic service request to allow the secure subsystem 202 to complete the cryptographic function. If the temperature is not within the temperature threshold range (e.g., temperature is within temperature threshold range and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device condition measurement process in which the device may determine a power supply status, including whether a power supply is sufficient, active/charging, and/or above a threshold level. For example, the condition may be whether the supplied power is above a power supply threshold level (e.g., level regulated by power supply controller, and/or stored by the device or external memory such as an authentication server), the input received in block 304 may include an indication of a present power supply level (e.g., whether power supply level is above power supply threshold level), and the secure subsystem 202 may be configured to determine whether the condition is met. If the power supply level is above the power supply threshold level (e.g., power supply level is above power supply threshold level and determination block 306="Yes"), the secure subsystem 202 may authorize usage of a cryptographic key corresponding to the cryptographic service request to allow the secure subsystem 202 to complete the cryptographic function. If the power supply level is not above the power supply threshold level (e.g., power supply level is above power supply threshold level and determination block 306="No"), the secure subsystem 202 may not authorize usage of a cryptographic key corresponding to the cryptographic service request, and the cryptographic service request may fail and access to secure information may be denied.

As a further example, in response to a cryptographic service request attempting to gain access to secure information, the applications processor 116 may initiate a device operating metric measurement process in which the device may measure a current operating bandwidth (e.g., 5G, LTE) or device download or upload speed. The condition may be whether the bandwidth is within an acceptable bandwidth threshold range (e.g., stored by the device or external memory such as an authentication server), the input received in block 304 may include an indication of a present bandwidth (e.g., whether bandwidth is within acceptable bandwidth threshold range), and the secure subsystem 202 may be configured to determine whether the condition is met. If the bandwidth is within an acceptable bandwidth threshold range (e.g., bandwidth is within acceptable bandwidth threshold range and determination block 306="Yes"), the secure subsystem 202 may authorize usage of a cryptographic key corresponding to the cryptographic service request to allow the secure subsystem 202 to complete the cryptographic function. If the bandwidth is not within an acceptable bandwidth threshold range (e.g., bandwidth is within acceptable bandwidth threshold range and determination block 306="No"), the secure subsystem 202 may not authorize usage of a cryptographic key corresponding to the cryptographic service request, and the cryptographic service request may fail and access to secure information may be denied.

As another example, in response to a cryptographic service request attempting to gain access to secure information, the applications processor 116 may initiate a device token receipt process in which the device may third party token has been received by the device implementing the SoC 102 (e.g., via the wireless transceiver 166). The condition may be whether the token has been received, the input received in block 304 may include an indication of a token receipt (e.g., whether a token is received), and the secure subsystem 202 may be configured to determine whether the condition is met. If the token has been received (e.g., token received and determination block 306="Yes"), the secure subsystem 202 may authorize usage of a cryptographic key corresponding to the cryptographic service request to allow the secure subsystem 202 to complete the cryptographic function. If the token has not been received (e.g., token has been received and determination block 306="No"), the secure subsystem 202 may not authorize usage of a cryptographic key corresponding to the cryptographic service request, and the cryptographic service request may fail and access to secure information may be denied.

As a further example, in response to a cryptographic service request attempting to gain access to secure information, the applications processor 116 may initiate a device operating metric measurement process in which the device may measure a current operating bandwidth (e.g., 5G, LTE) or device download or upload speed. The condition may be whether the bandwidth is within an acceptable bandwidth threshold range (e.g., stored by the device or external memory such as an authentication server), the input received in block 304 may include an indication of a present bandwidth (e.g., whether bandwidth is within acceptable bandwidth threshold range), and the secure subsystem 202 may be configured to determine whether the condition is met. If the bandwidth is within an acceptable bandwidth threshold range (e.g., bandwidth is within acceptable bandwidth threshold range and determination block 306="Yes"), the secure subsystem 202 may authorize usage of a cryptographic key corresponding to the cryptographic service request to allow the secure subsystem 202 to complete the cryptographic function. If the bandwidth is not within an acceptable bandwidth threshold range (e.g., bandwidth is within acceptable bandwidth threshold range and determination block 306="No"), the secure subsystem 202 may not authorize usage of a cryptographic key corresponding to the cryptographic service request, and the cryptographic service request may fail and access to secure information may be denied.

The sensing circuit 204 may generate an input indicating that a condition is or is not satisfied and/or indicating that the device implementing the SoC 102 has successfully connected to one or more secure networks, gateways, and/or servers. In other words, the input received in block 304 may include an indication of a device orientation of a device including the SoC 102, the condition may be whether the device orientation is within acceptable thresholds, and the secure subsystem 202 may be configured to determine whether the condition is met.

For example, in response to a cryptographic service request attempting to gain access to secure information, the applications processor 116 may initiate a device connection status determination process in which the device may determine active communication networks or connections (e.g., WAN/LAN, BLE). The condition may be whether the one or more connected networks are authorized networks (e.g., one or more networks stored by the device or external memory such as an authentication server), the input received in block 304 may include an indication of present connected networks (e.g., whether connected networks match authorized networks), and the secure subsystem 202 may be configured to determine whether the condition is met. If the connected networks match authorized networks (e.g., connected networks match authorized networks and determination block 306="Yes"), the secure subsystem 202 may authorize usage of a cryptographic key corresponding to the cryptographic service request to allow the secure subsystem 202 to complete the cryptographic function. If the connected networks do not match authorized networks (e.g., connected networks match authorized networks and determination block 306="No"), the secure subsystem 202 may not authorize usage of a cryptographic key corresponding to the cryptographic service request, and the cryptographic service request may fail and access to secure information may be denied.

In some embodiments, the secure subsystem 202 may require more than one condition to be satisfied before authorizing usage of a cryptographic key in response to a cryptographic service request. For example, the secure subsystem 202 may not authorize usage of a cryptographic key to allow the secure subsystem 202 to complete the cryptographic function until at least two conditions are satisfied as determined by the inputs received by the secure subsystem 202 from the sensing circuit 204. For example, the secure subsystem 202, before authorizing usage of or granting access to the cryptographic key, may require a condition that an iris image of an authorized user has been recorded in addition to a condition that a valid key fob is simultaneously detected. Satisfaction of both these conditions, as determined by the secure subsystem 202, may allow the secure subsystem 202 to authorize usage of the cryptographic key to complete the corresponding cryptographic service request.

In some embodiments, the secure subsystem may aggregate conditions and inputs received in block 304 to determine if at least one of a number of conditions have been satisfied before authorize usage of or granting access to a cryptographic key. For example, the secure subsystem 202 may be configured to require a percentage of applicable conditions related to the cryptographic service request to be satisfied (e.g., greater than 60%). As another example, the secure subsystem may be configured to require a minimum number of applicable conditions related to the cryptographic service request to be satisfied (e.g., 3 out of 7).

The order of operations performed in blocks 302-308 is merely illustrative, and the operations of blocks 302-308 may be performed in any order and partially simultaneously in some embodiments. In some embodiments, the method 300 may be performed by a processor of a device independently from, but in conjunction with, an external memory device. For example, the method 300 may be implemented as a software module executing within a processor of an SoC or in dedicated hardware within an SoC that issues commands to establish secure memory channels and access memory of an external memory device and is otherwise configured to take actions and store data as described.

Figure 4:
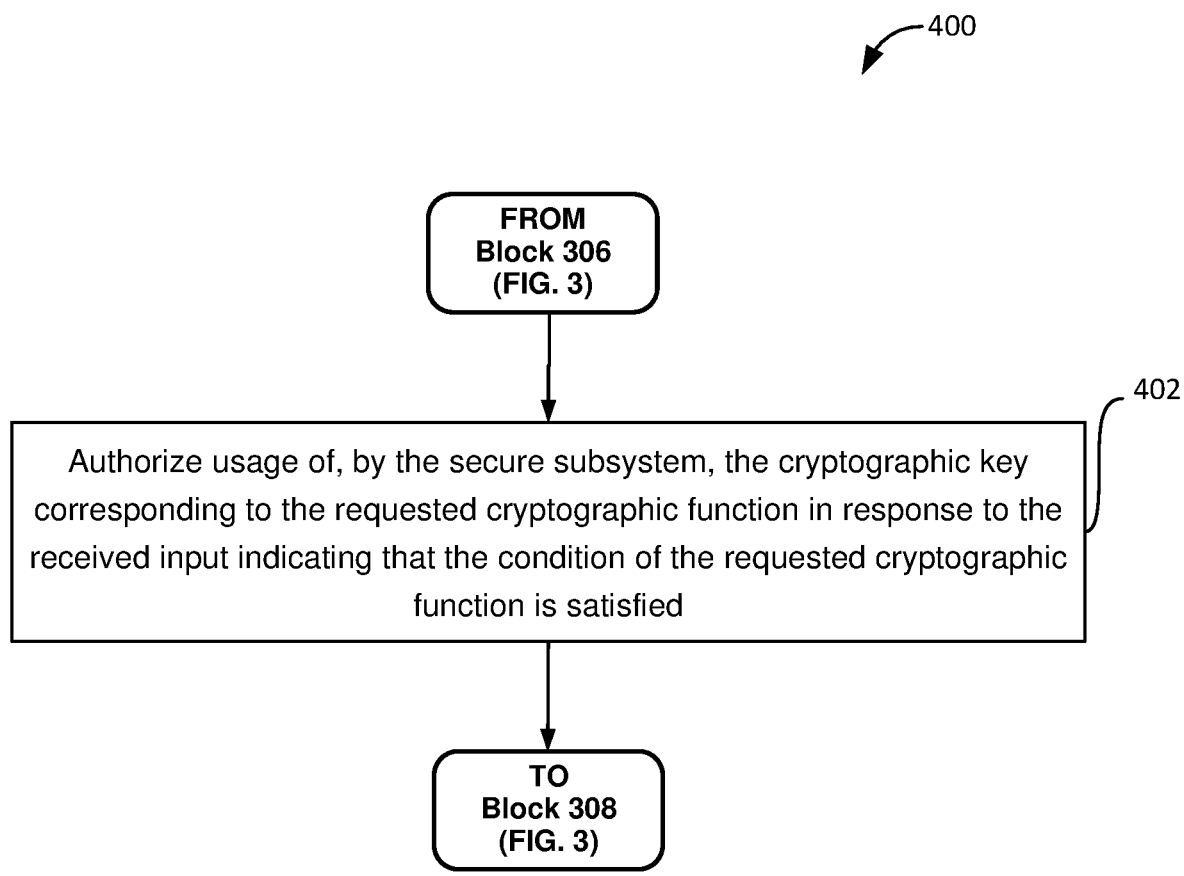
FIG. 4 is a process flow diagram illustrating embodiment methods that may be performed as part of providing security within an SoC according to some embodiments.

FIG. 4 is a process flow diagram illustrating an embodiment method 400 for providing security within an SoC that may be implemented as part of the method 300 in some embodiments. With reference to FIGS. 1-4, the method 400 may be implemented in a processor (e.g., processors 110, 112, 114, 116, 118, 152, 160) configured to perform operations of the method. In some embodiments, the processor (e.g., processors 110, 112, 114, 116, 118, 152, 160) may be configured to perform the operations by processor-executable instruction stored in a non-transitory processor-readable medium (e.g., memory devices 120, 158). Means for performing each of the operations of the method 300 may be a processor of the cryptographic system 200, such as the processors 110, 112, 114, 116, 118, 152, 160, the secure subsystem 202, the sensing circuit 204, and/or the like.

Following the operations of block 306 of the method 300 (FIG. 3), the secure subsystem may authorize usage of the cryptographic key corresponding to the requested cryptographic function in response to the received input indicating that the condition of the requested cryptographic function is satisfied in block 402. The secure subsystem (e.g., secure subsystem 202) may release, grant access to, or otherwise authorize usage of the cryptographic key corresponding to the cryptographic function by the secure subsystem to allow the secure subsystem to perform the cryptographic function. The secure subsystem may release, grant access to, or otherwise authorize usage of one or more cryptographic keys in response to one or more conditions. Determination by the secure subsystem that the input(s) satisfy the condition(s) may indicate that an authorized user and/or device has been successfully verified, and the requested cryptographic function is a valid uncompromised requested cryptographic function.

After performing the operations in block 402, the system may perform the operations in block 308 of the method 300 (FIG. 3) as described.

The processes in block 402 may be performed as described with reference to FIGS. 1-3. Means for performing the operations in block 402 may include a processor of the cryptographic system, such as the processors 110, 112, 114, 116, 118, 152, 160, the secure subsystem 202, the sensing circuit 204, and/or the like.

Figure 5:
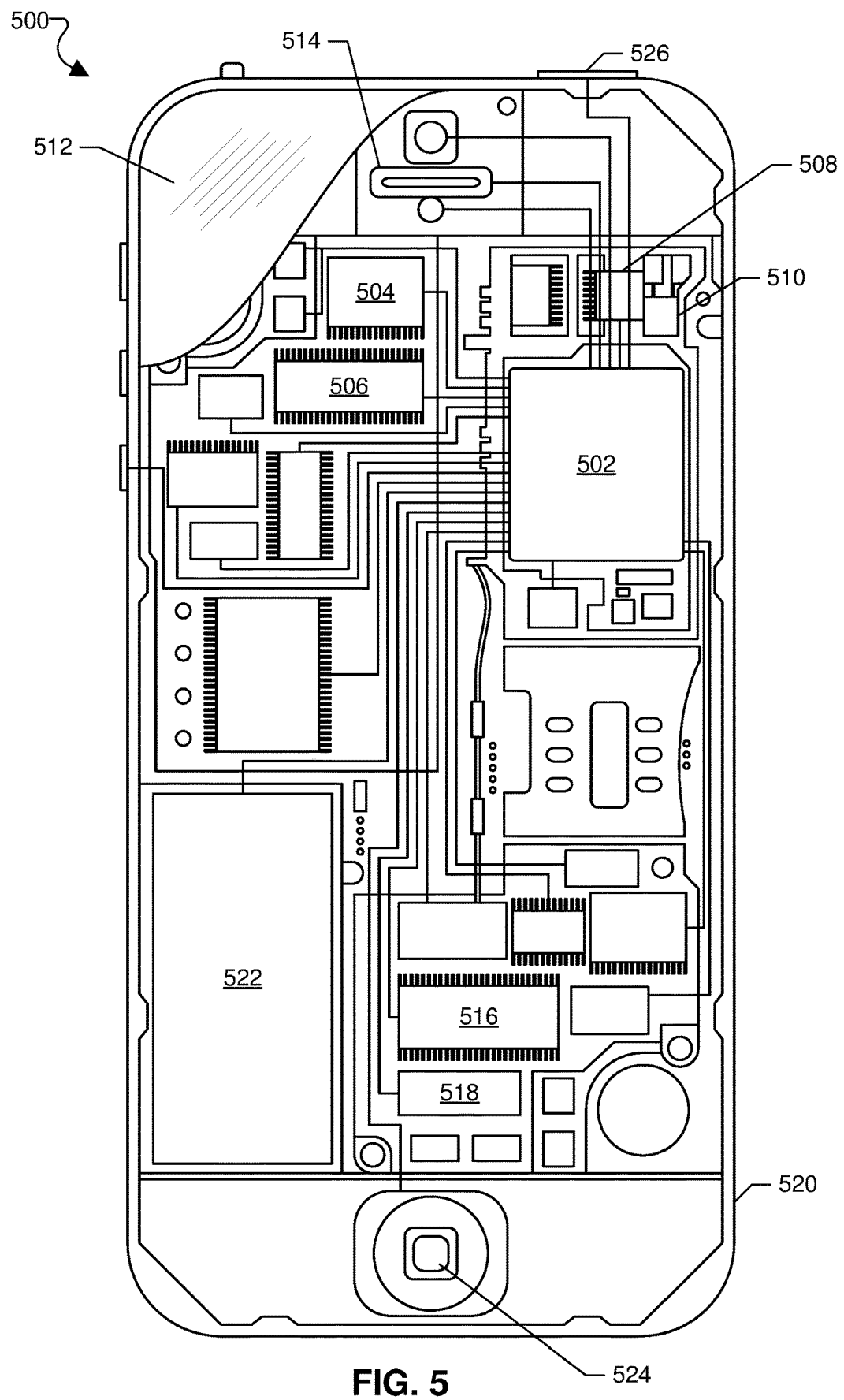
FIG. 5 is a component block diagram illustrating an example wireless communication device suitable for use with the various embodiments.

The various embodiments (including, but not limited to, embodiments described above with reference to FIGS. 1-4) may be implemented in a wide variety of computing systems including automotive vehicles or other mobile computing devices, an example of which suitable for use with the various embodiments is illustrated in FIG. 5. With reference to FIGS. 1-5, a mobile computing device 500 may include a processor 502 coupled to a touchscreen controller 504 and an internal memory 506. The processor 502 may be one or more multicore integrated circuits designated for general or specific processing tasks. The internal memory 506 may be volatile or non-volatile memory, and may also be secure and/or encrypted memory, or unsecure and/or unencrypted memory, or any combination thereof. Examples of memory types that may be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the mobile computing device 500 need not have touch screen capability.

The mobile computing device 500 may have one or more radio signal transceivers 508 (e.g., Peanut, Bluetooth, Zig-Bee, Wi-Fi, RF radio) and antennae 510, for sending and receiving communications, coupled to each other and/or to the processor 502. The transceivers 508 and antennae 510 may be used with the above-mentioned circuitry to implement the various wireless transmission protocol stacks and interfaces. The mobile computing device 500 may include a cellular network wireless modem chip 516 that enables communication via a cellular network and is coupled to the processor.

The mobile computing device 500 may include a peripheral device connection interface 518 coupled to the processor 502. The peripheral device connection interface 518 may be singularly configured to accept one type of connection, or may be configured to accept various types of physical and communication connections, common or proprietary, such as Universal Serial Bus (USB), FireWire, Thunderbolt, or PCIe. The peripheral device connection interface 518 may also be coupled to a similarly configured peripheral device connection port (not shown).

The mobile computing device 500 may also include speakers 514 for providing audio outputs. The mobile computing device 500 may also include a housing 520, constructed of a plastic, metal, or a combination of materials, for containing all or some of the components described herein. The mobile computing device 500 may include a power source 522 coupled to the processor 502, such as a disposable or rechargeable battery. The rechargeable battery may also be coupled to the peripheral device connection port to receive a charging current from a source external to the mobile computing device 500. The mobile computing device 500 may also include a physical button 524 for receiving user inputs. The mobile computing device 500 may also include a power button 526 for turning the mobile computing device 500 on and off.

Figure 6:
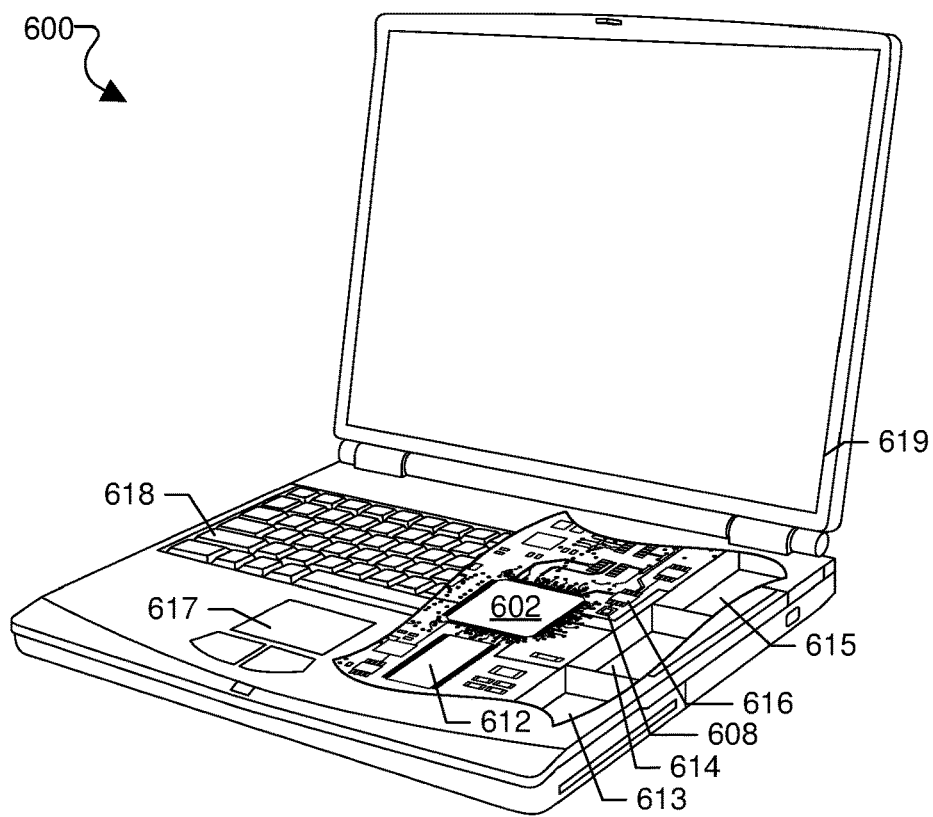
FIG. 6 is a component block diagram illustrating an example computing device suitable for use with the various embodiments.

The various embodiments (including, but not limited to, embodiments described above with reference to FIGS. 1-4) may be implemented in a wide variety of computing systems include a laptop computer 600 an example of which is illustrated in FIG. 6. With reference to FIGS. 1-6, a laptop computer may include a touchpad touch surface 617 that serves as the computer's pointing device, and thus may receive drag, scroll, and flick gestures similar to those implemented on computing devices equipped with a touch screen display and described above. A laptop computer 600 will typically include a processor 602 coupled to volatile memory 612 and a large capacity nonvolatile memory, such as a disk drive 613 of Flash memory. Additionally, the computer 600 may have one or more antenna 608 for sending and receiving electromagnetic radiation that may be connected to a wireless data link and/or cellular telephone transceiver 616 coupled to the processor 602. The computer 600 may also include a floppy disc drive 614 and a compact disc (CD) drive 615 coupled to the processor 602. The laptop computer 600 may include a touchpad 617, a keyboard 618, and a display 619 all coupled to the processor 602. Other configurations of the computing device may include a computer mouse or trackball coupled to the processor (e.g., via a USB input) as are well known, which may also be used in conjunction with the various embodiments.

Figure 7:
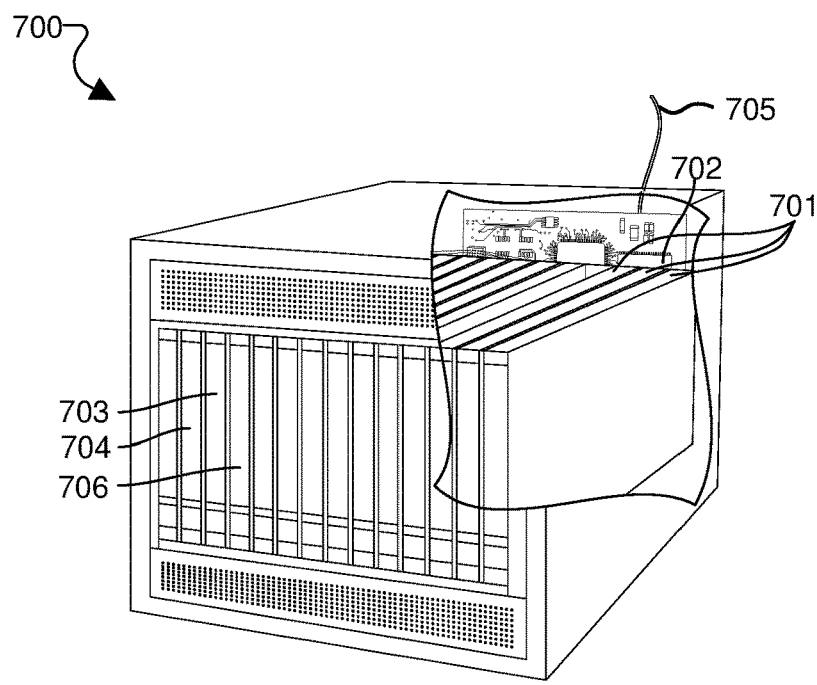
FIG. 7 is a component block diagram illustrating an example server suitable for use with the various embodiments.

The various embodiments (including, but not limited to, embodiments described above with reference to FIGS. 1-4) may also be implemented in fixed computing systems, such as any of a variety of commercially available servers. With reference to FIGS. 1-7, an example server 700 is illustrated in FIG. 7. Such a server 700 typically includes one or more multicore processor assemblies 701 coupled to volatile memory 702 and a large capacity nonvolatile memory, such as a disk drive 704. As illustrated in FIG. 7, multicore processor assemblies 701 may be added to the server 700 by inserting them into the racks of the assembly. The server 700 may also include a floppy disc drive, compact disc (CD) or digital versatile disc (DVD) disc drive 706 coupled to the processor 701. The server 700 may also include network access ports 703 coupled to the multicore processor assemblies 701 for establishing network interface connections with a network 705, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 8:
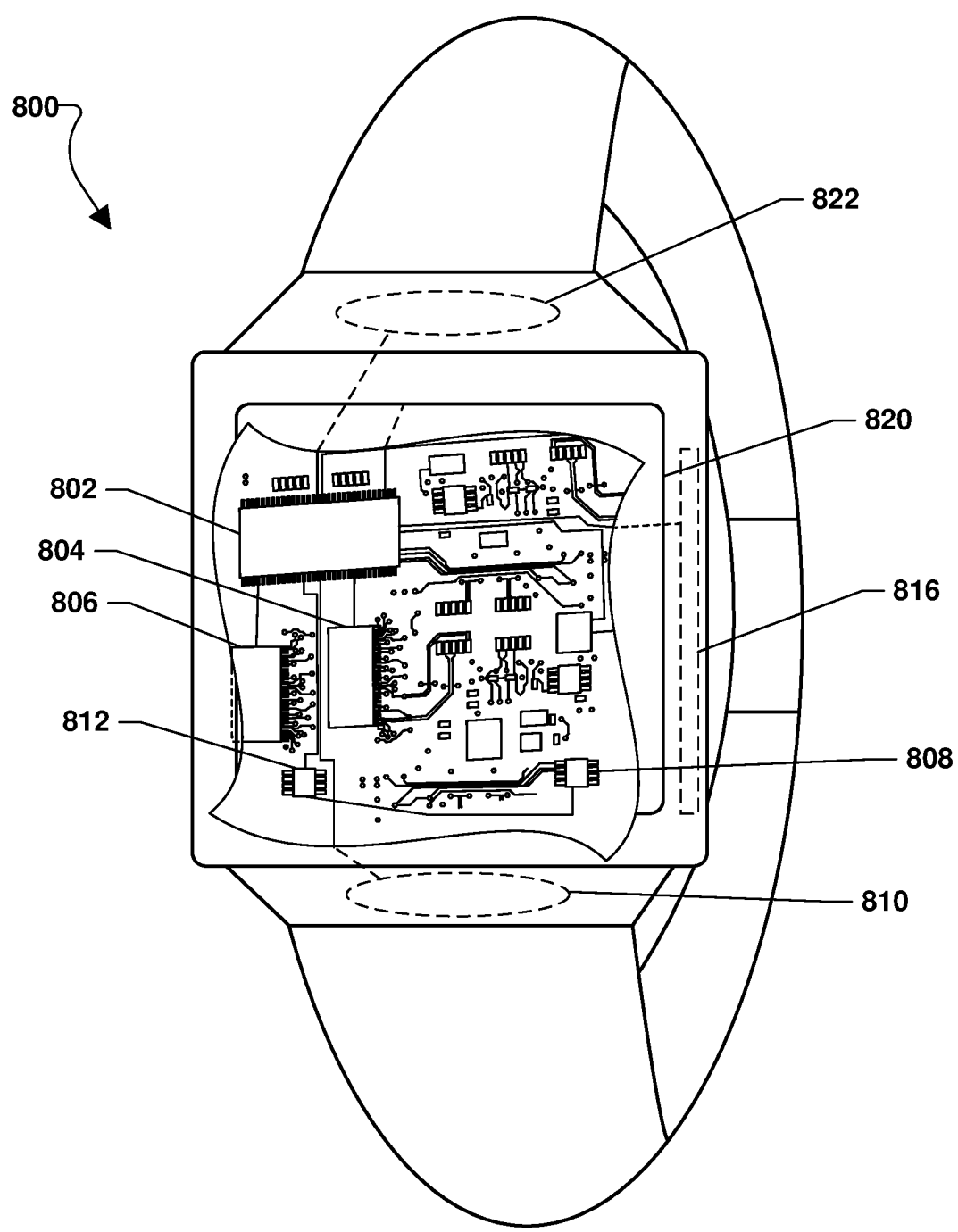
FIG. 8 illustrates an example wearable computing device in the form of a smart watch according to some embodiments.

The various embodiments may be implemented within a variety of computing devices, such as a wearable computing device. FIG. 8 illustrates an example wearable computing device in the form of a smart watch 800 according to some embodiments. A smart watch 800 may include a processor 802 coupled to internal memories 804 and 806. Internal memories 804, 806 may be volatile or non-volatile memories, and may also be secure and/or encrypted memories, or unsecure and/or unencrypted memories, or any combination thereof. The processor 802 may also be coupled to a touchscreen display 820, such as a resistive-sensing touchscreen, capacitive-sensing touchscreen infrared sensing touchscreen, or the like. Additionally, the smart watch 800 may have one or more antenna 808 for sending and receiving electromagnetic radiation that may be connected to one or more wireless data links 812, such as one or more Bluetooth® transceivers, Peanut transceivers, Wi-Fi transceivers, ANT+ transceivers, etc., which may be coupled to the processor 802. The smart watch 800 may also include physical virtual buttons 822 and 810 for receiving user inputs as well as a slide sensor 816 for receiving user inputs.

The touchscreen display 820 may be coupled to a touchscreen interface module that is configured receive signals from the touchscreen display 820 indicative of locations on the screen where a user's fingertip or a stylus is touching the surface and output to the processor 802 information regarding the coordinates of touch events. Further, the processor 802 may be configured with processor-executable instructions to correlate images presented on the touchscreen display 820 with the location of touch events received from the touchscreen interface module in order to detect when a user has interacted with a graphical interface icon, such as a virtual button.

The processor 802 may be any programmable microprocessor, microcomputer or multiple processor chip or chips that can be configured by software instructions (applications) to perform a variety of functions, including the functions of the various embodiments. In some devices, multiple processors may be provided, such as one processor dedicated to wireless communication functions and one processor dedicated to running other applications. Typically, software applications may be stored in an internal memory before they are accessed and loaded into the processor 802. The processor 802 may include internal memory sufficient to store the application software instructions. In many devices the internal memory may be a volatile or nonvolatile memory, such as flash memory, or a mixture of both. For the purposes of this description, a general reference to memory refers to memory accessible by the processor 802 including internal memory or removable memory plugged into the mobile device and memory within the processor 802 itself.

Implementation examples are described in the following paragraphs. Implementation examples described in terms of example methods further include: the example methods implemented in circuitry and processors configured with processor-executable instructions to perform operations of the example methods; the example methods implemented in means for performing functions of the methods; and the example methods implemented in a non-transitory processor-readable storage medium having stored thereon processor-executable instructions configured to cause a processor to perform operations of the example methods.

Example 1. A system-on-a-chip (SoC), including: a secure subsystem storing a cryptographic key and configured to: receive an input from a sensing circuit relevant to one or more conditions for performing a cryptographic function using the cryptographic key; and perform a cryptographic function in response to the received input indicating that a condition for performing the cryptographic function is satisfied.

Example 2. The SoC of example 1, further including a sensing circuit configured to sense a condition relevant to one or more conditions for performing the cryptographic function, in which the secure subsystem receives the input from the sensing circuit.

Example 3. The SoC of any of examples 1-2, in which the secure subsystem receives the input from a sensing circuit that is separate from the SoC.

Example 4. The SoC of any of examples 1-3, in which the secure subsystem is further configured to: receive a request for the cryptographic function from a service requesting environment; and perform the requested cryptographic function in response to the received input indicating that the condition for performing the requested cryptographic function is satisfied.

Example 5. The SoC of example 4, in which the secure subsystem is further configured to authorize usage of the cryptographic key corresponding to the cryptographic function to perform the requested cryptographic function in response to the received input indicating that the condition for performing the requested cryptographic function is satisfied.

Example 6. The SoC of any of examples 1-5, in which the secure subsystem is configured to receive the input from the sensing circuit along a communication path that is independent from a service requesting environment.

Example 7. The SoC of any of examples 1-6, in which the input includes a Boolean value indicating whether the condition for performing the cryptographic function is satisfied.

Example 8. The SoC of any of examples 1-7, in which the input includes operating sensor information, and in which the secure subsystem is configured to continuously receive the input from the sensing circuit.

Example 9. The SoC of any of examples 1-8, in which the secure subsystem includes one or both of: a secure processing unit (SPU) storing the cryptographic key, and configured to receive a request to perform the cryptographic function from a service requesting environment; or an SoC root-of-trust (RoT) configured to: receive the input from the sensing circuit; and receive the request to perform the cryptographic function from the service requesting environment.

Example 10. The SoC of any of examples 1-9, in which the condition for performing the cryptographic function includes whether a person is within a proximate range to physically operate a device, and the input includes an indication of a physical presence of the person within the proximate range to the device containing the SoC.

Example 11. The SoC of any of examples 1-10, in which the condition for performing the cryptographic function includes whether user physical characteristics match authorized user physical characteristics, and the input includes an indication of present user physical characteristics of a user of a device containing the SoC.

Example 12. The SoC of any of examples 1-11, in which the condition for performing the cryptographic function includes whether a device orientation is within acceptable thresholds, and the input includes an indication of the device orientation of a device including the SoC.

Example 13. The SoC of any of examples 1-12, in which the condition for performing the cryptographic function includes whether a device location is in an authorized location, and the input includes an indication of the device location of a device including the SoC.

Example 14. The SoC of any of examples 1-13, in which the condition for performing the cryptographic function includes whether a proximate device is an authorizing device, and the input includes an indication of the proximate device capable of connecting to a device including the SoC.

Example 15. The SoC of any of examples 1-14, in which the condition for performing the cryptographic function includes whether a communication network matches an authorized communication network, and the input includes an indication of the communication network detected by a device including the SoC.

Example 16. A method for providing security in a system-on-a-chip (SoC), including: receiving, from a service requesting environment by a secure subsystem, a request to perform a cryptographic function, in which the secure subsystem stores a condition for performing the requested cryptographic function; receiving, by the secure subsystem, an input from a sensing circuit that includes at least one indication relevant to the condition for performing the requested cryptographic function; determining, by the secure subsystem, whether the input indicates that the condition for performing the requested cryptographic function is satisfied; and performing the requested cryptographic function using a cryptographic key stored in the secure subsystem in response to determining that the condition is satisfied.

Example 17. The method of example 16, in which receiving the input from the sensing circuit includes the secure subsystem receiving the input from the sensing circuit along a communication path that is independent from the service requesting environment.

Example 18. The method of any of examples 16-17, in which receiving the input from the sensing circuit includes receiving a Boolean value indicating whether the condition for performing the requested cryptographic function is satisfied.

Example 19. The method of any of examples 16-18, in which the input is operating sensor information, and in which receiving the input from the sensing circuit includes the secure subsystem continuously receiving the input from the sensing circuit.

Example 20. The method of any of examples 16-19, in which performing the requested cryptographic function in response to determining that the condition is satisfied includes performing the cryptographic function by one of a secure processing unit (SPU) or an SoC root-of-trust (RoT) in response to determining that the condition is satisfied.

Example 21. The method of any of examples 16-20, in which: the condition for performing the cryptographic function includes whether a person is within a proximate range to physically operate a device; and determining whether the input indicates that the condition for performing the requested cryptographic function is satisfied includes determining whether the input includes an indication of a physical presence of the person within the proximate range to the device containing the SoC.

Example 22. The method of any of examples 16-21, in which: the condition for performing the cryptographic function includes whether user physical characteristics match authorized user physical characteristics; and determining whether the input indicates that the condition for performing the requested cryptographic function is satisfied includes determining whether the input includes an indication of present user physical characteristics of a user of a device containing the SoC.

Example 23. The method of any of examples 16-22, in which: the condition for performing the cryptographic function includes whether a device orientation is within acceptable thresholds; and determining whether the input indicates that the condition for performing the requested cryptographic function is satisfied includes determining whether the input includes an indication of the device orientation of a device including the SoC.

Example 24. The method of any of examples 16-23, in which: the condition for performing the cryptographic function includes whether a device location is in an authorized location; and determining whether the input indicates that the condition for performing the requested cryptographic function is satisfied includes determining whether the input includes an indication of the device location of a device including the SoC.

Example 25. The method of any of examples 16-24, in which: the condition for performing the cryptographic function includes whether a proximate device is an authorizing device; and determining whether the input indicates that the condition for performing the requested cryptographic function is satisfied includes determining whether the input includes an indication of the proximate device capable of connecting to a device including the SoC.

Example 26. The method of any of examples 16-25, in which: the condition for performing the cryptographic function includes whether a communication network matches an authorized communication network; and determining whether the input indicates that the condition for performing the requested cryptographic function is satisfied includes determining whether the input includes an indication of the communication network detected by a device including the SoC.

Computer program code or "program code" for execution on a programmable processor for carrying out operations of the various embodiments may be written in a high-level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A system-on-a-chip (SoC), comprising:
 a secure subsystem storing a cryptographic key and configured to:
  receive an input from a sensing circuit relevant to a condition for performing a cryptographic function using the cryptographic key, wherein the condition is associated with performance metrics of the sensing circuit;
  receive a request to perform the cryptographic function from a service requesting environment, wherein the received request is distinct from the received input from the sensing circuit; and
  perform the cryptographic function in response to receipt of the request to perform the cryptographic function and the received input indicating that the condition for performing the cryptographic function is satisfied.

2. The SoC of claim 1, further comprising a sensing circuit configured to sense a condition relevant to one or more conditions for performing the cryptographic function, wherein the secure subsystem receives the input from the sensing circuit.

3. The SoC of claim 1, wherein the secure subsystem is configured to receive the input from a sensing circuit that is separate from the SoC.

4. The SoC of claim 1, wherein the secure subsystem is further configured to:
 receive a request for the cryptographic function from a service requesting environment; and
 perform the requested cryptographic function in response to the received input indicating that the condition for performing the requested cryptographic function is satisfied.

5. The SoC of claim 4, wherein the secure subsystem is further configured to authorize usage of the cryptographic key corresponding to the cryptographic function to perform the requested cryptographic function in response to the received input indicating that the condition for performing the requested cryptographic function is satisfied.

6. The SoC of claim 1, wherein the secure subsystem is configured to receive the input from the sensing circuit along a communication path that is independent from a service requesting environment.

7. The SoC of claim 1, wherein the input includes a Boolean value indicating whether the condition for performing the cryptographic function is satisfied.

8. The SoC of claim 1, wherein the input includes operating sensor information, and wherein the secure subsystem is configured to continuously receive the input from the sensing circuit.

9. The SoC of claim 1, wherein the secure subsystem comprises one or both of:
 a secure processing unit (SPU) configured to store the cryptographic key, and configured to receive the request to perform the cryptographic function from a service requesting environment; or
 an SoC root-of-trust (RoT) configured to:
  receive the input from the sensing circuit; and
  receive the request to perform the cryptographic function from the service requesting environment.

10. The SoC of claim 1, wherein the condition for performing the cryptographic function is whether a person is within a proximate range to physically operate a device, and the input includes an indication of a physical presence of the person within the proximate range to the device containing the SoC.

11. The SoC of claim 1, wherein the condition for performing the cryptographic function is whether user physical characteristics match authorized user physical characteristics, and the input includes an indication of present user physical characteristics of a user of a device containing the SoC.

12. The SoC of claim 1, wherein the condition for performing the cryptographic function is whether a device orientation is within acceptable thresholds, and the input includes an indication of the device orientation of a device including the SoC.

13. The SoC of claim 1, wherein the condition for performing the cryptographic function is whether a device location is in an authorized location, and the input includes an indication of the device location of a device including the SoC.

14. The SoC of claim 1, wherein the condition for performing the cryptographic function is whether a proximate device is an authorizing device, and the input includes an indication of the proximate device capable of connecting to a device including the SoC.

15. The SoC of claim 1, wherein the condition for performing the cryptographic function is whether a communication network matches an authorized communication network, and the input includes an indication of the communication network detected by a device including the SoC.

16. A method for providing security in a system-on-a-chip (SoC), comprising:
 receiving, from a service requesting environment by a secure subsystem, a request to perform a cryptographic function, wherein the secure subsystem stores a condition for performing the requested cryptographic function, wherein the condition is associated with performance metrics of a sensing circuit;

receiving, by the secure subsystem, an input from a sensing circuit that is distinct from the received request and includes at least one indication relevant to the condition for performing the requested cryptographic function;

determining, by the secure subsystem, whether the input indicates that the condition for performing the requested cryptographic function is satisfied; and performing the requested cryptographic function using a cryptographic key stored in the secure subsystem in response to receipt of the request to perform the cryptographic function and determining that the received input indicates that the condition for performing the requested cryptographic function is satisfied.

17. The method of claim 16, wherein receiving the input from the sensing circuit comprises the secure subsystem receiving the input from the sensing circuit along a communication path that is independent from the service requesting environment.

18. The method of claim 16, wherein receiving the input from the sensing circuit comprises receiving a Boolean value indicating whether that the condition for performing the requested cryptographic function is satisfied.

19. The method of claim 16, wherein the received input is operating sensor information, and wherein receiving the input from the sensing circuit comprises the secure subsystem continuously receiving the input from the sensing circuit.

20. The method of claim 16, wherein performing the requested cryptographic function in response to determining that the received input indicates that the condition is satisfied comprises performing the cryptographic function by one of a secure processing unit (SPU) or an SoC root-of-trust (RoT) in response to determining that the condition is satisfied.

21. The method of claim 16, wherein:
the condition for performing the cryptographic function is whether a person is within a proximate range to physically operate a device; and
determining whether the received input indicates that the condition for performing the requested cryptographic function is satisfied comprises determining whether the input includes an indication of a physical presence of the person within the proximate range to the device containing the SoC.

22. The method of claim 16, wherein:
the condition for performing the cryptographic function is whether user physical characteristics match authorized user physical characteristics; and
determining whether the received input indicates that the condition for performing the requested cryptographic function is satisfied comprises determining whether the input includes an indication of present user physical characteristics of a user of a device containing the SoC.

23. The method of claim 16, wherein:
the condition for performing the cryptographic function is whether a device orientation is within acceptable thresholds; and
determining whether the received input indicates that the condition for performing the requested cryptographic function is satisfied comprises determining whether the input includes an indication of the device orientation of a device including the SoC.

24. The method of claim 16, wherein:
the condition for performing the cryptographic function is whether a device location is in an authorized location; and
determining whether the input indicates that the condition for performing the requested cryptographic function is satisfied comprises determining whether the received input includes an indication of the device location of a device including the SoC.

25. The method of claim 16, wherein:
the condition for performing the cryptographic function is whether a proximate device is an authorizing device; and
determining whether the input indicates that the condition for performing the requested cryptographic function is satisfied comprises determining whether the received input includes an indication of the proximate device capable of connecting to a device including the SoC.

26. The method of claim 16, wherein:
the condition for performing the cryptographic function is whether a communication network matches an authorized communication network; and
determining whether the input indicates that the condition for performing the requested cryptographic function is satisfied comprises determining whether the received input includes an indication of the communication network detected by a device including the SoC.

27. A system-on-a-chip (SoC), comprising:
a secure subsystem storing a cryptographic key and a condition for performing a cryptographic function, wherein the secure subsystem comprises:
means for receiving a request to perform the cryptographic function;
means for receiving an input from a sensing circuit that is distinct from the received request and includes at least one indication relevant to at least one condition for performing the cryptographic function, wherein the condition is associated with performance metrics of the sensing circuit;
means for determining whether the input indicates that the condition for performing the cryptographic function is satisfied; and
means for performing the cryptographic function in response to receipt of the request to perform the cryptographic function and determining that the received input indicates that the condition for performing the requested cryptographic function is satisfied.

28. The SoC of claim 27, wherein means for receiving the input from the sensing circuit further comprises:
means for receiving the input from the sensing circuit along a communication path that is independent from a service requesting environment.

29. The SoC of claim 27, wherein means for receiving the input from the sensing circuit comprises means for continuously receiving the input from an operating sensing circuit.

30. A non-transitory processor-readable medium having stored thereon processor-executable instructions configured to cause a processor within a secure subsystem of an integrated circuit to perform operations comprising:
receiving a request to perform a cryptographic function from a service requesting environment;
receiving an input from a sensing circuit that is distinct from the received request and includes at least one indication relevant to a condition for performing the cryptographic function, wherein the condition is associated with performance metrics of the sensing circuit;

determining whether the input indicates that the condition for performing the cryptographic function is satisfied; and performing the cryptographic function in response to receipt of the request to perform the cryptographic function and determining that the received input indicates that the condition for performing the requested cryptographic function is satisfied.

* * * * *